(12) United States Patent
Murphy et al.

(10) Patent No.: US 7,287,765 B2
(45) Date of Patent: Oct. 30, 2007

(54) SPORTS BAG WITH INTEGRAL TRANSPORTATION SYSTEM

(76) Inventors: Howard L. Murphy, 14 Fernwood St., Gretna, LA (US) 70056; Thomas F. Gardner, 244 Rosewood Dr., Metairie, LA (US) 70005

( * ) Notice: Subject to any disclaimer, the term of this patent is extended or adjusted under 35 U.S.C. 154(b) by 138 days.

(21) Appl. No.: 11/143,936

(22) Filed: Jun. 3, 2005

(65) Prior Publication Data
US 2005/0275175 A1 Dec. 15, 2005

Related U.S. Application Data

(60) Provisional application No. 60/618,588, filed on Oct. 15, 2004, provisional application No. 60/576,620, filed on Jun. 4, 2004.

(51) Int. Cl.
*B62B 1/12* (2006.01)
(52) U.S. Cl. ............... 280/47.26; 280/652; 206/315.3
(58) Field of Classification Search ............. 280/47.17, 280/47.2, 47.24, 47.26, 47.34, 652, DIG. 5, 280/DIG. 6; 248/96; 206/315.3, 315.6, 206/315.7, 315.8
See application file for complete search history.

(56) References Cited

U.S. PATENT DOCUMENTS

| | | |
|---|---|---|
| 2,579,937 A | 12/1951 | Larsen |
| 2,590,178 A | 3/1952 | Jamison |
| 2,699,951 A | 1/1955 | Gans |
| 2,726,874 A | 12/1955 | Sullivan |
| 2,760,782 A | 8/1956 | Hartzell |
| 2,902,287 A | 9/1959 | Elias |
| 3,489,426 A | 1/1970 | Bond |
| 3,738,677 A | 6/1973 | Renock |
| 3,900,209 A | 8/1975 | McDonnell |
| 3,985,373 A * | 10/1976 | Widegren ............ 280/652 |
| 4,017,091 A | 4/1977 | Wallen |
| 4,053,169 A | 10/1977 | Taylor |
| 4,400,006 A | 8/1983 | Larkin |
| 4,522,299 A | 6/1985 | Clark et al. |
| 4,735,425 A | 4/1988 | Hoff |
| 4,792,152 A | 12/1988 | Carolan |
| 4,822,071 A | 4/1989 | Widegren |
| 4,832,362 A | 5/1989 | Chen |
| 4,890,856 A | 1/1990 | Mursch et al. |
| 4,911,465 A | 3/1990 | Hauer |
| 5,112,068 A | 5/1992 | Liao et al. |

(Continued)

*Primary Examiner*—Christopher Bottorff
(74) *Attorney, Agent, or Firm*—Garvey, Smith, Nehrbass & North, L.L.C.; Brett A. North

(57) ABSTRACT

The sports bag assembly, which can accommodate the transportation and storage of sports equipment, entails a fully and permanently assembled integral transportation system comprising two or more wheels. The wheels can be deployed and retracted with a single mechanical movement, and may be stowed within the geometry of a traditional golf bag. The golf bag assembly will fit within the recessed areas of platforms attached to the rear of motorized carts; within conventional storage racks, lockers, and auto trunks typically found around golf courses and in residences; and within traditional golf travel cover containers or systems. The golf bag assembly also includes a ventilated club storage compartment, to facilitate the drying of grips, and drainage in the event of inclement weather. The golf bag assembly includes a support and suspension system that restrains the grip ends of clubs, thereby stabilizing and enhancing the protection of clubs during transport and play.

47 Claims, 20 Drawing Sheets

U.S. PATENT DOCUMENTS

| | | |
|---|---|---|
| 5,267,750 A | 12/1993 | Thompson |
| 5,427,403 A | 6/1995 | Hsiao |
| 5,435,546 A | 7/1995 | Rao |
| 5,454,576 A | 10/1995 | Pitkanen |
| 5,470,095 A | 11/1995 | Bridges |
| 5,478,097 A | 12/1995 | Forma |
| 5,632,496 A | 5/1997 | Nelson |
| 5,868,247 A | 2/1999 | Schrader |
| 5,879,022 A | 3/1999 | Winton |
| 5,944,132 A * | 8/1999 | Davies et al. ............... 180/168 |
| 6,007,031 A | 12/1999 | Tang |
| 6,050,592 A | 4/2000 | Kim |
| 6,056,301 A | 5/2000 | Berliner et al. |
| 6,062,991 A * | 5/2000 | Moriarty et al. ............ 473/407 |
| 6,148,998 A * | 11/2000 | Tan ........................ 206/315.3 |
| 6,186,522 B1 | 2/2001 | Weis |
| 6,231,059 B1 | 5/2001 | Cheldin |
| 6,299,183 B1 | 10/2001 | Kaneko |
| D459,850 S | 7/2002 | Seng |
| 6,425,589 B1 | 7/2002 | Wu |
| 6,434,781 B1 * | 8/2002 | Guerra ..................... 15/256.5 |
| 6,464,076 B2 * | 10/2002 | Tan ........................ 206/315.6 |
| 6,554,299 B1 | 4/2003 | Bartos |
| 6,561,527 B2 | 5/2003 | Spadino |
| 6,607,076 B1 | 8/2003 | Smith |
| 6,659,477 B2 | 12/2003 | Jung |
| 6,698,789 B2 | 3/2004 | Reimers et al. |
| D488,606 S | 4/2004 | Scholz |
| 6,802,515 B2 | 10/2004 | Sorenson et al. |
| 6,979,019 B2 * | 12/2005 | Chen ........................ 280/652 |
| 6,988,738 B2 * | 1/2006 | Lu ......................... 280/47.26 |
| 7,080,732 B2 * | 7/2006 | Bonfanti .................. 206/315.3 |
| 7,114,730 B2 * | 10/2006 | Cheldin .................. 280/47.24 |
| 2003/0146602 A1 | 8/2003 | Lu |
| 2004/0046343 A1 | 3/2004 | Sorenson et al. |
| 2004/0113380 A1 | 6/2004 | Freedman |

* cited by examiner

SPORTS BAG WITH INTEGRAL TRANSPORTATION SYSTEM

CROSS-REFERENCE TO RELATED APPLICATIONS

This non-provisional application claims the benefit of priority to provisional application Ser. No. 60/576,620 filed on Jun. 4, 2004, and to provisional application Ser. No. 60/618,588 filed on Oct. 15, 2004. The disclosures in those applications are incorporated by reference herein.

FIELD OF THE INVENTION

The invention generally relates to sports equipment bags. More particularly, the invention relates to a bag with an integral transportation system that can be deployed, and then retracted and stored within the confines of the bag. The invention may be used in connection with any sport that utilizes clubs, sticks, bats, poles or any similar elongated devices in connection with the striking, hitting or driving of circular, spherical, elliptical or similar objects.

A typical use of the invention is as a golf bag assembly with an integral transportation system whose overall dimensions of height or length, and diameter or girth, are consistent with the geometry of a traditional golf bag, and which system facilitates and enhances the mobility, transportation and storage of the golf bag and its contents, including, without limitation, clubs and related golf accessories and personal items, such as golf balls, tees, gloves, divot repair tools, ball retrieval devices, markers, pencils, score cards, scoring devices, tape, medical supplies, sunscreen, eyeglasses, distance or range finders, global positioning devices, watches, jewelry, clothing, shoes, umbrellas and other related items.

BACKGROUND OF INVENTION

Golf is a game played on a natural surface, although some surfaces can be artificial. Golf essentially consists of utilizing a club to strike a ball mounted on a tee from a tee area; transporting clubs, golf accessories and personal items, typically in a bag; finding the ball; and repeating the striking and transporting process over the length of a hole until the golfer reaches the green area and completes the hole. After the completion of each hole, the clubs, golf accessories and personal items, typically in a bag, are transported by the golfer from the green area to the next tee area. This sequence is repeated throughout a round of golf, which traditionally is played outdoors on a course that consists of eighteen holes and spans a distance of between three to eight miles.

A golf bag for the transportation of clubs, golf accessories and personal items is standard equipment for any golfer. Traditional golf bags generally are cylindrical in shape with an opening at the top of the bag to accommodate the insertion and removal of clubs and some types of elongated accessories. Additionally, traditional golf bags typically are equipped with compartments or pockets placed at various locations on the outer circumference of the golf bag to facilitate the transportation and storage of golf accessories and personal items.

The storage of clubs, golf accessories and personal items adds substantial weight to the golf bag and oftentimes creates a heavy load for the golfer to lift, move, carry or otherwise transport about the golf course. As a result, golfers have availed themselves of several alternatives to ease the physical demands associated with lifting, moving, carrying or otherwise transporting a golf bag, replete with clubs, golf accessories and personal items, about the golf course and elsewhere. Golf bags have incorporated shoulder straps or hand grips to the outer circumference of the golf bag that a golfer can utilize to lift, carry or otherwise move the golf bag throughout a round of golf. A golfer can hire a caddy or an assistant to carry or otherwise move the golf bag throughout a round of golf. The golfer can place the golf bag on a motorized cart and use the cart to drive to the location of each shot. The golfer may mount the bag on a manual or motorized pull or push cart that the golfer utilizes to roll the golf bag to the location of each shot.

A golfer must expend considerable physical effort, in addition to expense, to avoid the burdens imposed by manually lifting, carrying, moving or transporting the golf bag around a golf course. Although wheels could be mounted to the base of a golf bag in a permanently fixed and exposed position, such wheels are awkward in appearance. Moreover, such wheels can be hazardous, especially when a golfer inserts or removes the bag from the trunk or storage hatch of a vehicle, stores the bag, or tries to carry or otherwise move the golf bag rather than rolling it. Golf bags with wheels in a permanently fixed and exposed position do not fit within the recessed areas of platforms attached to the rear of motorized carts. Wheels in a permanently fixed and exposed position create a bulky and irregular shape that makes it difficult, to impossible, to store the golf bag in conventional storage racks, bins, lockers, trunks, platforms or other similar storage configurations typically found in and around golf courses and residences. Additionally, golf bags with wheels in a permanently fixed and exposed position do not fit within traditional golf travel cover containers or systems.

Some golf bag designs have sought, in a less than elegant and practical fashion, to address the awkward appearance, difficulties in handling and storage, and operational hazards posed by wheels mounted on a bag in a permanently fixed and exposed position by making the wheels and their associated equipment detachable. However, after detachment, the wheels and their associated equipment must be stored either within the bag itself or in a separate carryall or container. When the wheels and associated equipment are stored within the bag, they severely compromise the amount of space within the bag's club storage area. The reduction in space precludes or limits the room needed for the adequate storage of clubs, golf accessories and personal items. It also impairs the golfer's ability to remove and re-insert clubs in the bag. Furthermore, the golfer must expend considerable time and effort to attach the wheels and their associated equipment to the bag before initiating play, and to detach and store the wheels and their associated equipment after play is completed.

Moreover, designs consisting of detachable wheels and their associated equipment oftentimes have necessitated that the length and circumference of a traditional golf bag be substantially increased; that the bag be reshaped in an entirely new configuration, such as a square or rectangle; or that the outer compartments of the bag be materially expanded to accommodate the storage of the detached wheels and their associated equipment as well as golf accessories and personal items. These modifications create an excessively bulky and deformed rolling bag that bears little resemblance to a traditional golf bag; is disproportionate in weight; difficult to maneuver; and not suitable for the transportation and storage of clubs, golf accessories and personal items. Enlargements in the bag's length and circumference, in addition to the bag's outer compartments, also cause the bag to be so broad, that it cannot fit within the recessed areas of platforms attached to the rear of motorized carts. Additionally, the bag is dimensionally incompatible with conventional storage racks, bins, lockers, trunks, platforms or other similar storage configurations typically found in and around golf courses and residences, and with traditional golf travel cover containers or systems.

Prior attempts to overcome the challenges posed by the incorporation of a transportation system into a traditionally shaped golf bag have not satisfactorily addressed all of these complications and shortcomings simultaneously. That is, there is no golf bag employing an integral transportation system that can be deployed and retracted without the need to assemble and disassemble component parts that includes three wheels versus two; that maintains the appearance and dimensions of a traditional golf bag; that includes adequate storage space for clubs, golf accessories and personal items; that utilizes a portion of the space commonly used for golf club storage to stow the integral transportation system; that does not limit the regulatory permissible number of clubs that may be stored in the club storage area; that reduces the operational hazards associated with transferring the golf bag assembly in and out of a vehicle trunk or hatch; that fits in the recessed areas of platforms attached to the rear of motorized carts; and that is dimensionally compatible with conventional storage racks, bins, lockers, trunks, platforms or other similar storage configurations typically found in and around golf courses and residences, and with traditional golf travel cover containers or systems.

For example, U.S. Pat. No. 6,231,059 appears to disclose a golf bag pull-cart with laterally extending wheels and an extendible arm that serves as a handle for the pull-cart. The spine and base of the support frame are integrated into a golf bag, and the wheels are extendible along the longitudinal axis of the axle away from the base. Nonetheless, the wheel assembly platform of the '059 patent is completely and permanently exposed even in its retracted position. The base includes recessed spaces for the wheels that only partially accept the retracted wheels. Furthermore, the height of the bag is materially greater than the height of a traditional golf bag in order to create a usable club storage area. Essentially, the '059 patent fails to disclose a golf bag where the integral transportation system can be fully retracted and stored within the golf bag when the system is not deployed and also fails to disclose a golf bag where the storage area for the integral transportation system does not require the height of the bag to be materially greater than the height of a traditional golf bag in order to maintain an adequate club storage space. Additionally, the '059 patent fails to disclose a club support and suspension system that elevates shorter clubs above the lowest point of the golf bag, and restricts the movement of all clubs during transportation. The wheel assembly present in the '059 patent precludes the golf bag of the '059 patent invention from being used in traditional storage systems and golf bag travel cover containers or systems or from being placed in the recessed areas of platforms attached to the rear of motorized carts. The wheel assembly mounted under the base of the bag in the '059 patent also increases the vertical dimension of the bag, and in turn, the effective height at which the clubs rest relative to the ground, thereby impeding or preventing the removal of clubs from the bag due to insufficient space between clubs and the roofing or foul weather systems typically found on motorized carts.

U.S. Pat. No. 6,561,527 appears to disclose a hybrid golf bag that includes an open top, closed bottom body with a wheel mount attached to the bottom of the body and a handle attached near the top of the body. The wheels extend beyond the periphery of the golf bag body and retract to a position proximate to the periphery of the bag. A rigid push-pull handle is included to pull or push the golf bag body. Essentially, the '527 patent fails to disclose a golf bag where the integral transportation system is fully retracted and stored within the golf bag when the system is not deployed. The golf bag of the '527 patent will not function on a motorized cart, because the bag will not fit in the recessed areas of platforms attached to the rear of such carts. Further, the wheels of the '527 patent, even when retracted, will tend to rotate off the motorized cart platform. Additionally, the wheels attached to the bottom of a golf bag of the '527 patent extend the vertical dimension of the golf bag and preclude the placement of the bag in traditional storage systems and golf bag travel cover containers or systems. The '527 patent also presents clubs at a higher than normal position due to a higher lip at the top of the bag. The increased vertical dimension impedes or prevents the removal of clubs from the bag due to insufficient space between the clubs and the roofing or foul weather systems typically found on motorized carts. The '527 patent fails to disclose a golf bag where the integral transportation system is concealed and stored within the golf bag when the system is not deployed and where the stowage area for the integral transportation system does not excessively impinge upon the interior storage area for clubs. The '527 patent fails to disclose a club support and suspension system that elevates shorter clubs above the lowest point of the base or floor of the bag, restricts the movement of the grip ends of clubs during transportation, and includes perforations in the bottom panel to facilitate the ventilation of the club storage area and its drainage in the event of inclement weather.

U.S. Pat. No. 4,400,006 is another example of a golf bag with a retractable rolling assembly. The '006 patent appears to disclose a rollable golf bag that includes a assembly in which detachable wheels and related components are stored within the golf bag and must be reattached before the golfer can utilize the assembly. The golf bag of the '006 patent also necessitates that the detached wheels and related components be stored in a recessed well formed in a portion of the peripheral wall of the golf bag. This method of storage appears to have required an enlargement of the bag's overall dimensions. The '006 patent does not appear to disclose a golf bag where the transportation system is integral to the bag, that requires no assembly or disassembly of component parts, and that remains intact and is stored within the golf bag when the system is not deployed. Further, the '006 patent does not appear to disclose an integral transportation system that does not excessively impinge upon the interior storage area for clubs. Indeed, the recessed well incorporated in the peripheral wall of the bag of the '006 patent appears to significantly reduce the club storage area within the interior of the bag, despite increases in the outer dimensions of the bag. The '006 patent fails to disclose a golf bag where the integral transportation system fully retracts and is stored within the bag when the system is not deployed. Further, no disclosure is evident of a club suspension and support system that elevates shorter clubs above the lowest point of the base or floor of the golf bag, restricts the movement of the grip ends of clubs during transportation, and includes perforations in the bag's bottom panel to facilitate the ventilation of the club storage area and its drainage in the event of inclement weather.

None of the previous golf bag assemblies provides adequate space for the storage of clubs, golf accessories and personal items, while providing an integral transportation system with wheels which are fully retractable and are stowed within the geometry of a traditional golf bag without significantly compromising the storage area for clubs, golf accessories and personal items. None of the previous golf bag assemblies provides a support and suspension system for grip ends of clubs in the base or floor of the bag to minimize movement in the grip ends of clubs and thereby protect the clubs from contacting one another during transport, and also includes perforations in the bottom panel of the bag to ventilate the club storage area, to promote the drying of the grip ends of clubs and to drain the club storage area in the event of inclement weather.

What is needed is a new golf bag assembly, replete with a fully and permanently assembled integral transportation system which can be deployed with a single mechanical movement, and all of which can be fully retracted and stowed within the geometry of a traditional golf bag, and that will fit within the recessed areas of platforms attached to the rear of motorized carts; within conventional storage racks, bins, lockers, trunks, platforms or other similar storage configurations typically found in and around golf courses and residences; and within traditional golf travel cover containers or systems.

SUMMARY OF THE INVENTION

The golf bag assembly of the present invention includes a fully and permanently assembled integral transportation system that is composed of multiple wheels, that is best exemplified in a three wheeled embodiment. The integral transportation system is contained in a golf bag of traditional height, internal diameter and exterior girth without significantly diminishing or functionally impinging upon the club storage area present in traditional golf bags. The golf bag assembly of the present invention enables golfers to exercise by walking golf courses without having to expend energy lifting or carrying a golf bag, clubs, golf accessories and personal items. It also affords golfers the means to move a golf bag, together with its contents, including clubs, golf accessories and personal items, without having to transport, assemble, rent or otherwise procure a separate piece of equipment, such as a cumbersome non-integrated rolling cart or a motorized cart. By maintaining the traditional dimensions and purpose of a golf bag, the golf bag assembly of the present invention also affords a golfer, who chooses to ride on a motorized cart, the ability to easily mount the golf bag assembly on the recessed area of the platform attached to the rear of the motorized cart, which platform would not accommodate a traditional golf bag attached to an external or non-integrated rolling cart, a golf bag with permanently fixed and exposed wheels, or a golf bag with a transportation system that included attachable and detachable wheels and related components. The golf bag assembly of the present invention can be more easily inserted and removed from the trunk or hatch of a vehicle without encountering operational hazards. Furthermore, it occupies less space in a trunk or hatch of a vehicle than the space a traditional golf bag with an external or non-integrated rolling cart would occupy. The golf bag assembly of the present invention can be stored in traditional golf bag storage stands, racks, lockers, bins, trunks, platforms and other similar storage configurations typically found in and around golf courses and residences. Additionally, golfers who travel with the golf bag assembly of the present invention can still use traditional golf travel cover containers and systems.

The golf bag assembly of the present invention comprises an internal structural system for rigidity and to maintain the bag's overall geometry. Components of the internal structural system, consisting of a pattern of latitudinal bands and longitudinal rods that are mated to mechanisms that are a part of the integral transportation system, enable the integral transportation system to deploy multiple wheels from their respective recessed stowage compartments with one mechanical movement. Deployment is initiated by elevating a steering handle above the top ring or collar of the bag. The angle of the steering handle can be adjusted to best conform to the height of the golfer. When the wheels of the golf bag assembly of the present invention are extended and locked in the deployed position, the assembly may be rolled, instead of lifted, carried or otherwise moved to traverse pavement, stone, shell, brick, asphalt, wooden planks and similar man-made surfaces, as well as various types of natural organic and non-organic materials such as ground cover, grass, sand, pine straw, rock, stone, dirt and other surfaces typically found on golf courses.

The incorporation of multiple wheels in the golf bag assembly of the present invention, that is best exemplified in the three wheeled embodiment, greatly enhances the mobility of the assembly. Including at least a forward wheel and two rear wheels allows the golfer the flexibility to either push or pull the golf bag assembly. Furthermore, it is not necessary for the golfer to tilt the golf bag assembly to the rear and at an angle closer to the ground to initiate movement. Additionally, having at least a forward wheel and two rear wheels provides greater stability and greater weight distribution. Moreover, with at least a forward wheel and two rear wheels, there is greater physical contact between the wheels and the surface of the ground, which improves the ability of the golf bag assembly to traverse less dense terrains and also minimizes damage to the golf course. Although the features of the golf bag assembly of the present invention are best exemplified in the three wheeled embodiment, embodiments containing a different number of wheels are achievable too.

The golf bag of the present invention is equipped with a bottom panel that ventilates the interior of the club storage compartment, promotes the drying of the grip ends of clubs, and drains the club storage compartment in the event of inclement weather. The golf bag also includes a support and suspension system in the bottom panel of the base of the bag that elevates and restrains the grip ends of clubs in the bag, thereby stabilizing and protecting the clubs during transport and play.

The golf bag assembly of the present invention comprises recessed stowage compartments to conceal the multiple wheel integral transportation system in a retracted position, as well as storage compartments for golf accessories and personal items.

Traditional golf bags generally have a uniform flat bottom panel and the grip ends of the clubs usually rest directly on the flat bottom panel. The golf bag assembly of the present invention stores clubs in a traditional pattern, except the elevation of the bottom panel forming the base of the bag is sloped from the back of the bag to a point approximately midway between the mid-line and the front of the bag. Longer clubs are placed in the forward part of the bag where the bottom panel is deepest, whereas shorter clubs are placed in the rear part of the bag where the bottom panel is elevated. The unique configuration of the bottom panel of the bag creates space for the stowage of the wheels and their associated equipment without substantially altering the vertical and horizontal dimensions, plus the shape and utility, of a traditional golf bag. While the golf bag assembly of the present invention may be embodied in a traditional circular, oval or elliptical shape, it also may be embodied in a non-traditional rectangular, square or similarly configured shape.

Embodiments of the golf bag assembly of the present invention may utilize typical golf bag exterior finish systems, consisting of upholstered or molded materials, that also serve to conceal and protect the integral transportation system when the system is in the retracted position.

The golf bag assembly of the present invention contains a plurality of compartments around the outer circumference of the bag for the storage of golf accessories and personal items, that are outfitted with Velcro®, zippers, buttons, compression snaps, or hook and loop closure devices. Further, the interior side of the storage system for the transportation system may contain pockets or other compartments that are accessible when the transportation system is deployed.

While specific dimensions have been provided in the accompanying figures detailing an exemplary embodiment of the golf bag assembly of the present invention, other shapes, sizes or dimensions could be employed to achieve similar satisfactory results depending upon the nature and size of the clubs, golf accessories and personal items the golf bag assembly must store and transport.

BRIEF DESCRIPTION OF THE DRAWINGS

The above-mentioned and other features of this invention, and the manner of attaining them, will become more apparent, and the invention itself will be better understood, by reference to the following descriptions of the embodiments of the invention viewed in conjunction with the accompanying figures where.

DETAILED DESCRIPTION OF INVENTION

Figure 1:
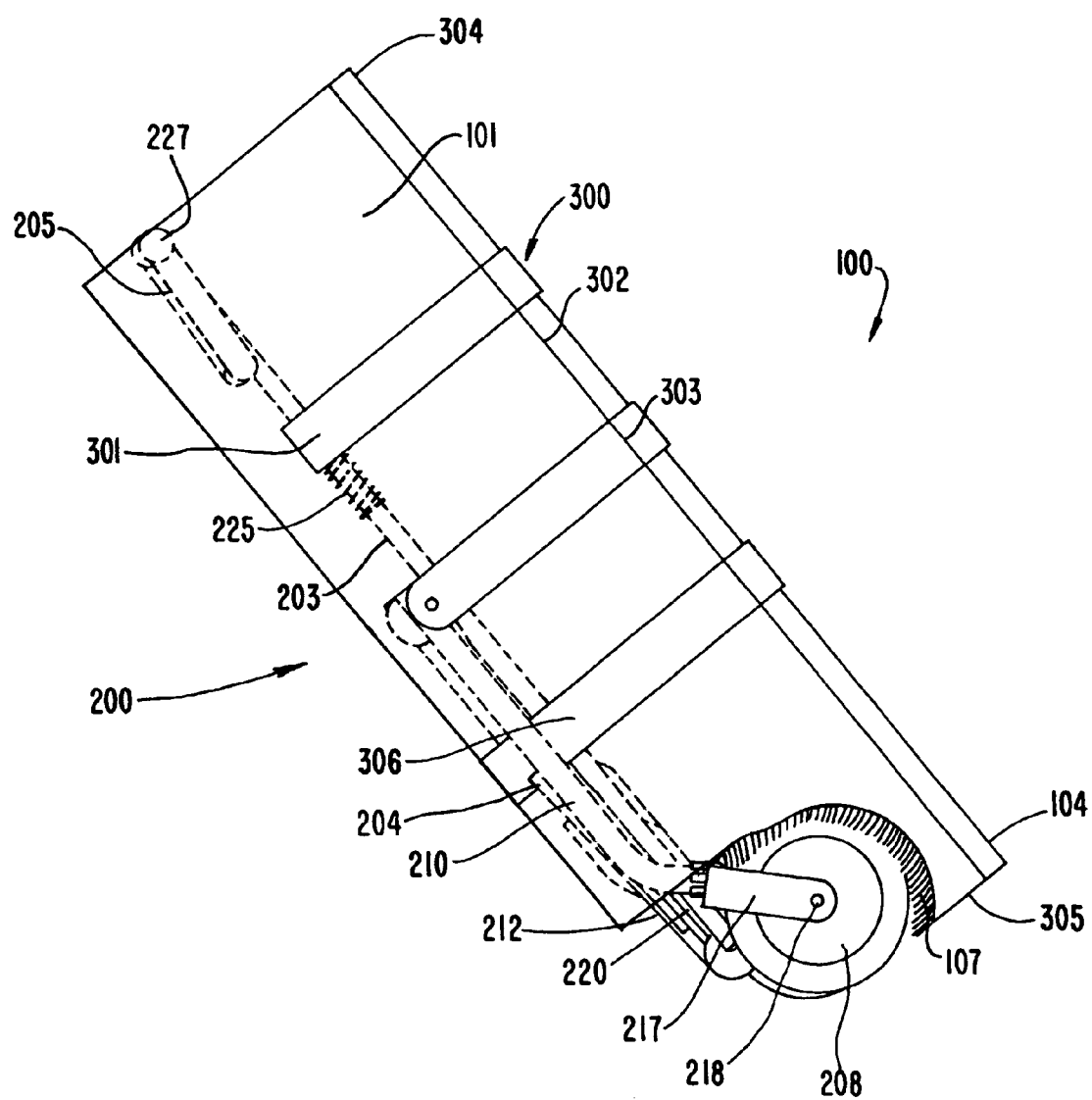
FIG. 1 illustrates a side profile view of the golf bag assembly of the present invention with the multiple wheel integral transportation system in a retracted position.
Figure 2:
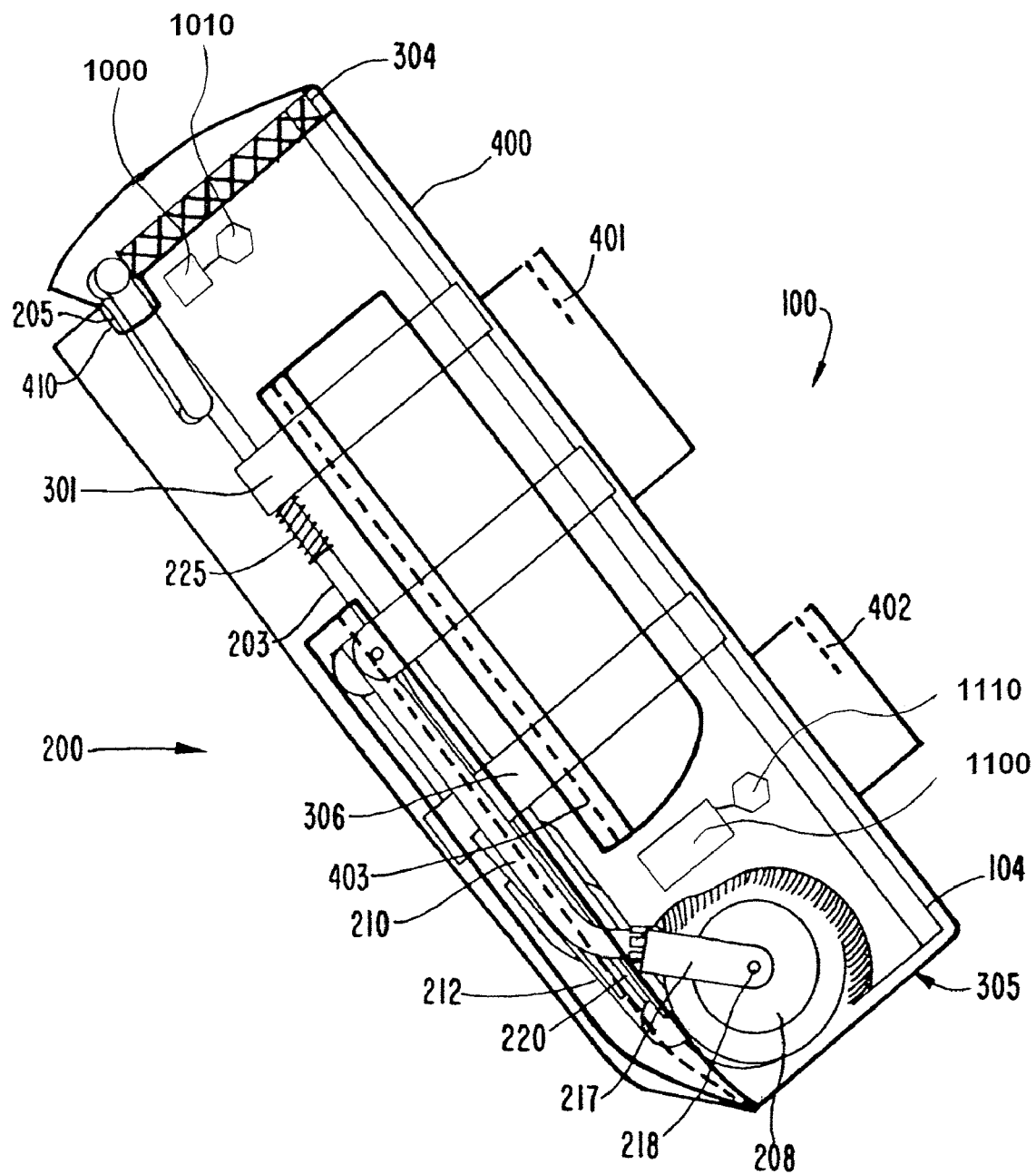
FIG. 2 illustrates a side profile view of the golf bag assembly of the present invention, replete with upholstered outer covering, with the multiple wheel integral transportation system in a retracted position.
Figure 3:
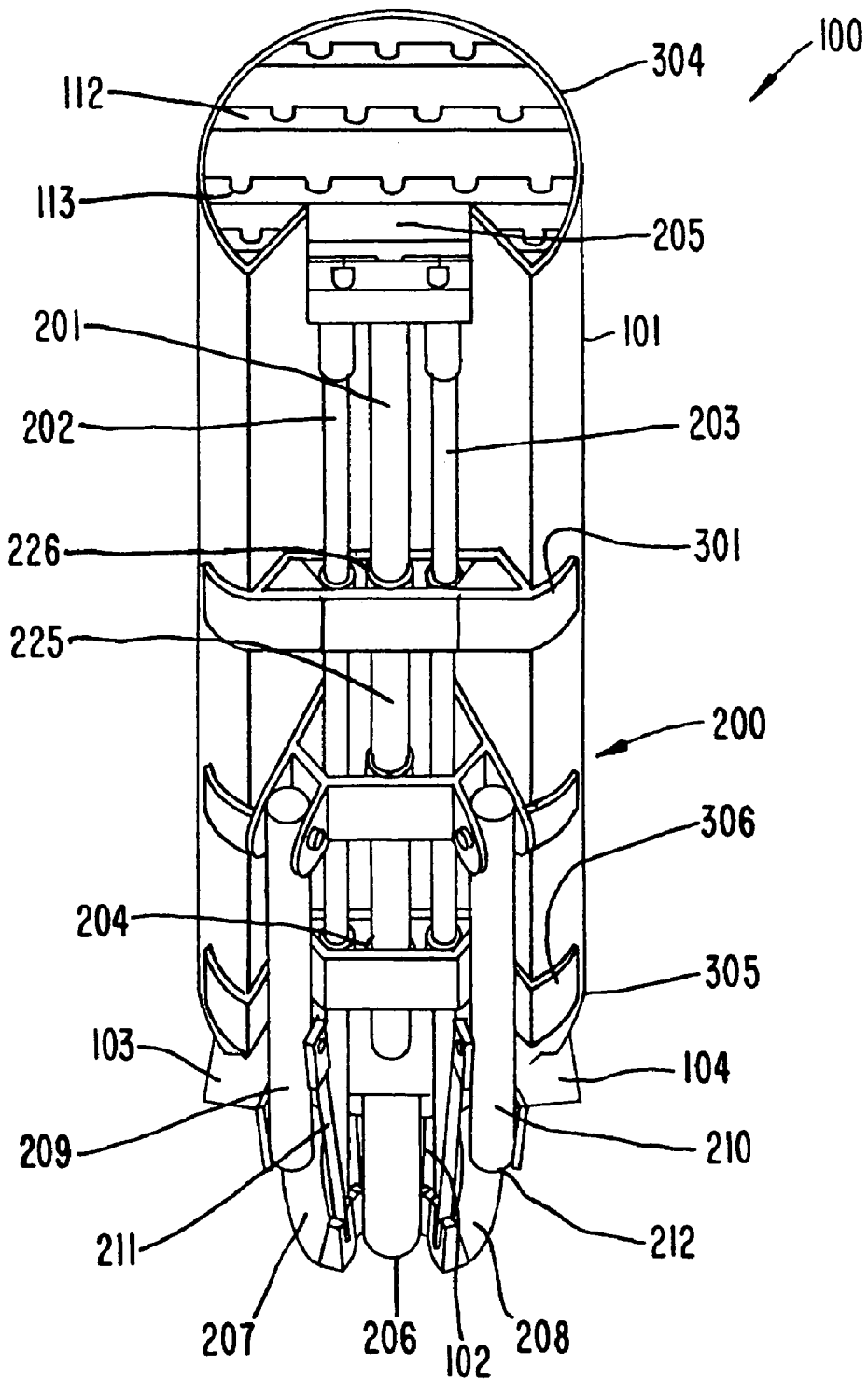
FIG. 3 illustrates a rear profile view of the golf bag assembly of the present invention with the multiple wheel integral transportation system in a retracted position.

As depicted in FIG. 1, FIG. 2 and FIG. 3, the golf bag assembly 100 of the present invention comprises a bag 101; an integral transportation system 200, that consists of multiple wheels 206, 207, 208 and their associated equipment that deploy and retract with a single mechanical movement initiated by the ascension of the steering handle 205; and an internal structural system 300. The golf bag assembly 100 contains stowage compartments 103, 104 below the bottom panel forming the base 305 of the bag, where the multiple wheels 206, 207, 208 of the integral transportation system 200 are stowed following retraction and are concealed by the upholstery (see FIG. 2 and FIG. 4) that envelopes the structural system 300 of the assembly. An upholstered compartment 410 also exists for concealment of the steering handle 205 when the integral transportation system 200 is in the retracted position. Additionally, the upholstery 400 of the bag assembly 100 may include storage compartments or pockets located at various locations on the outer circumference of the bag assembly 100 outfitted with Velcro®, zippers, buttons, compression snaps, or hook and loop closure devices for the placement, storage, transport and safekeeping of golf accessories and personal items.

Referring again to FIG. 1, the internal structural system 300 consists of latitudinal bands 301, more or less evenly placed at multiple horizontal levels in relation to the bag 101, in addition to multiple longitudinal rods 302 situated, for example, in the center of the two front quadrants of the bag 101, that provide skeletal structure and rigidity to the golf bag assembly 100. The longitudinal rods 302 intersect with vertical passages 303 in the latitudinal bands 301 and connect at their upper terminus to the top cylindrical ring or collar 304 of the bag, and connect at their lower terminus to the bottom panel forming the base 305 of the bag near the circumference of the base 305. The conjoined latitudinal bands 301 and longitudinal rods 302 connect to the integral transportation system 200 to provide structural support and rigidity to maintain the integrity and geometry of the golf bag assembly 100, and to resist forces or loads imposed on the golf bag assembly 100 arising from the handling and transport of the assembly 100, or the removal and replacement of clubs, golf accessories and personal items in the bag 101.

The latitudinal bands 301 and longitudinal rods 302 may be constructed from strong and rigid lightweight materials. For example, the latitudinal bands 301 can consist of metal or plastic tubing, rods, belts, flat bands, or the like. For example, the longitudinal rods 302 can consist of metal or plastic tubing or rods sufficient to resist compressive and other loads resulting from the weight of various components of the bag, golf accessories and personal items contained in the bag 101, forces associated with the removal and replacement of clubs, golf accessories, and personal items in the bag, and forces associated with the transport of the golf bag assembly 100. The latitudinal bands 301 and longitudinal rods 302 may be covered or otherwise housed in upholstered sleeves that are attached to or form part of the inner side of the bag to prevent the clubs from contacting the latitudinal bands and longitudinal rods upon removal or replacement.

Although the cross-section of the exemplary embodiment is essentially circular in shape, by varying the number and position of the latitudinal bands 301 and longitudinal rods 302, the cross-sectional configuration of the bag can be oval, elliptical, rectangular or square in shape.

Figure 8:
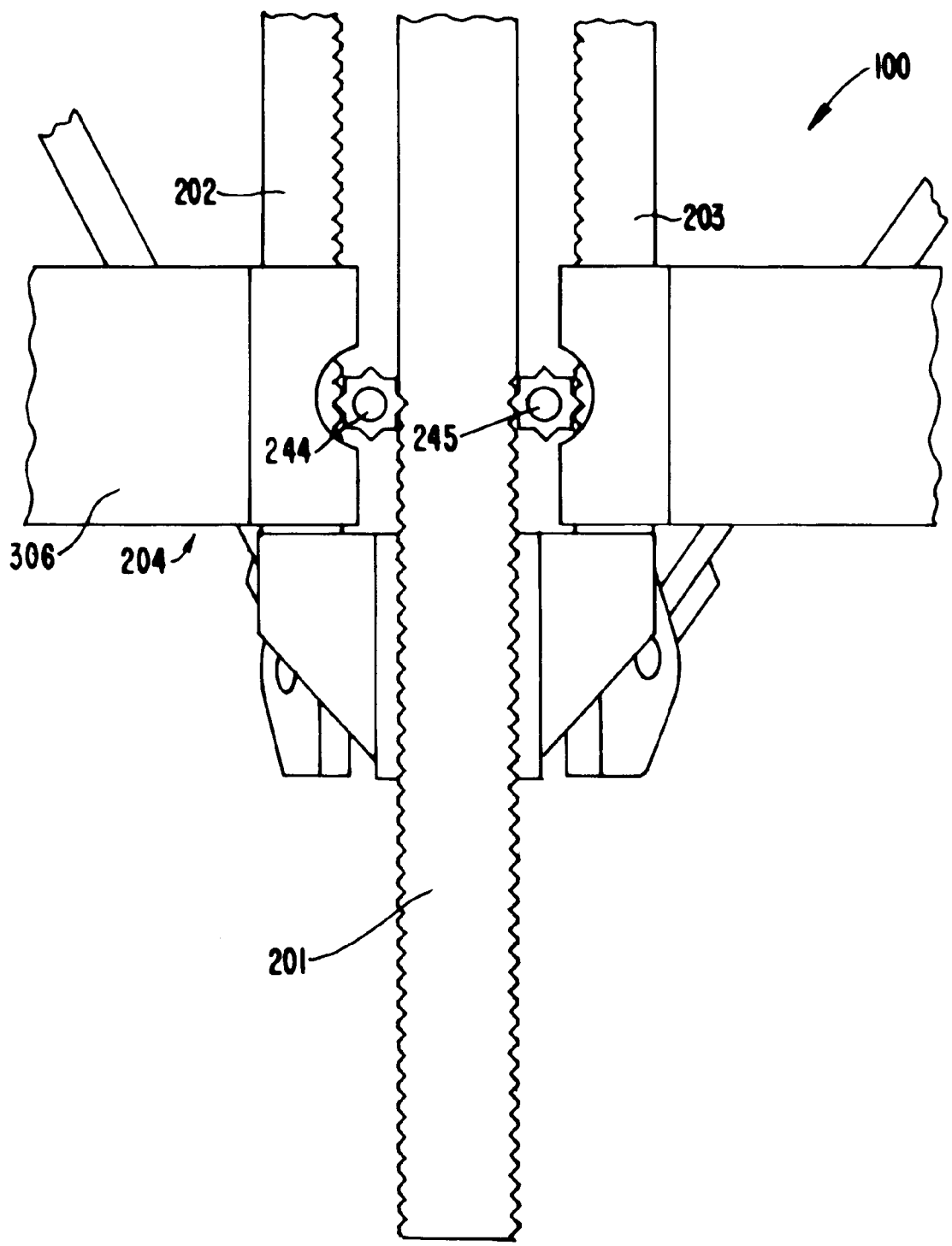
FIG. 8 illustrates the gear mechanism of the golf bag assembly of the present invention that permits deployment or retraction of the multiple wheels in one mechanical movement.

As best shown in FIG. 3, the integral transportation system 200 consists of a center transient rod 201 and two outside transient rods 202, 203 that intersect and are mechanically attached to the rear side of the latitudinal bands 301. A gear system 204, also shown in detail in FIG. 8, may be mechanically fastened or affixed to the lowest latitudinal band 306, has dual gears 244, 245 that interface with serrations along both sides of the center transient rod 201 and along the inner sides of the outside transient rods 202, 203. The gear system 204 may include other force transfer systems that consist of coordinated components which convert a directional force in one direction to produce a resulting force in the opposite direction.

Figure 6:
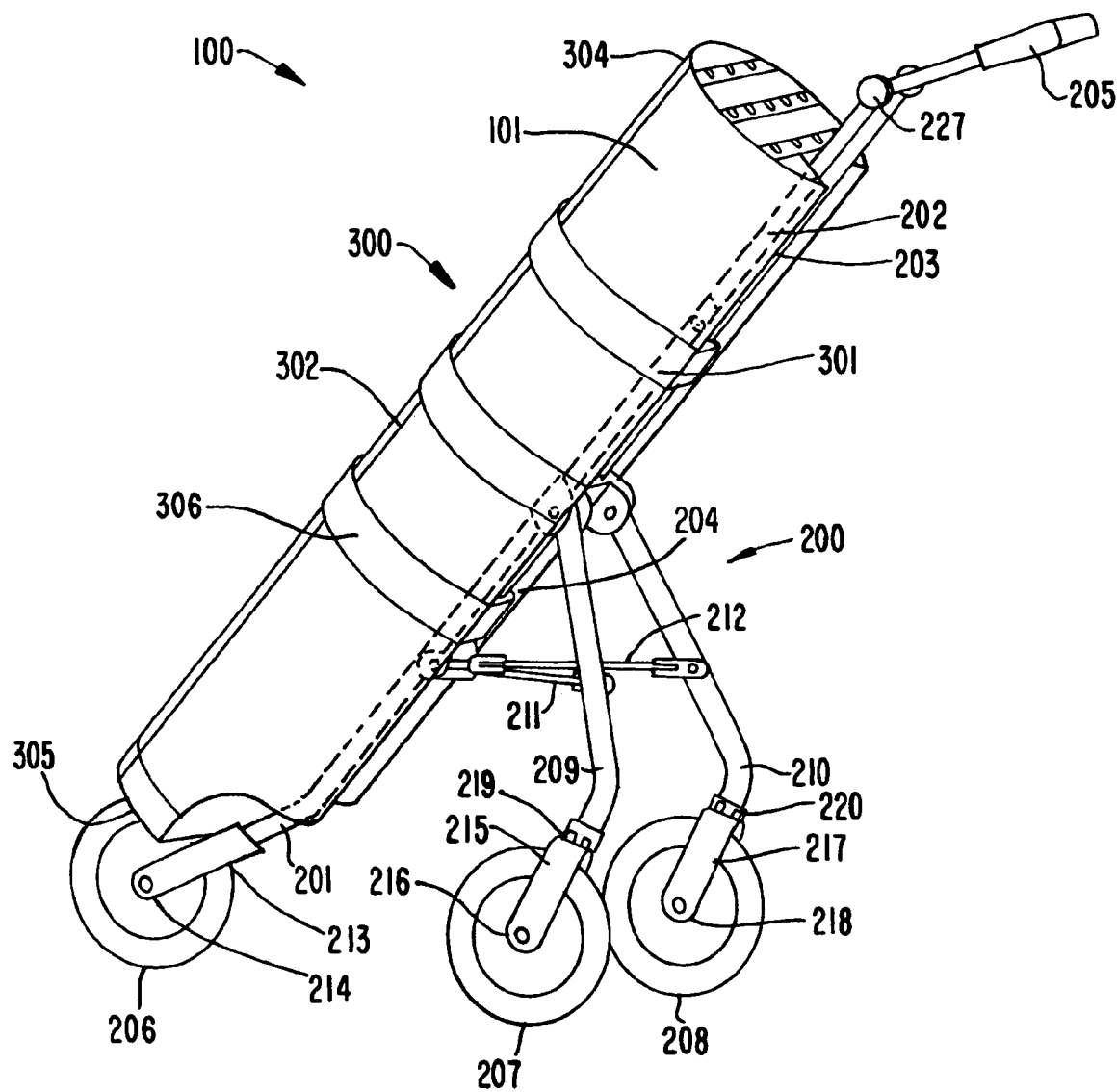
FIG. 6 illustrates a perspective view of the golf bag assembly of the present invention with the multiple wheel integral transportation system in a deployed position.
Figure 7:
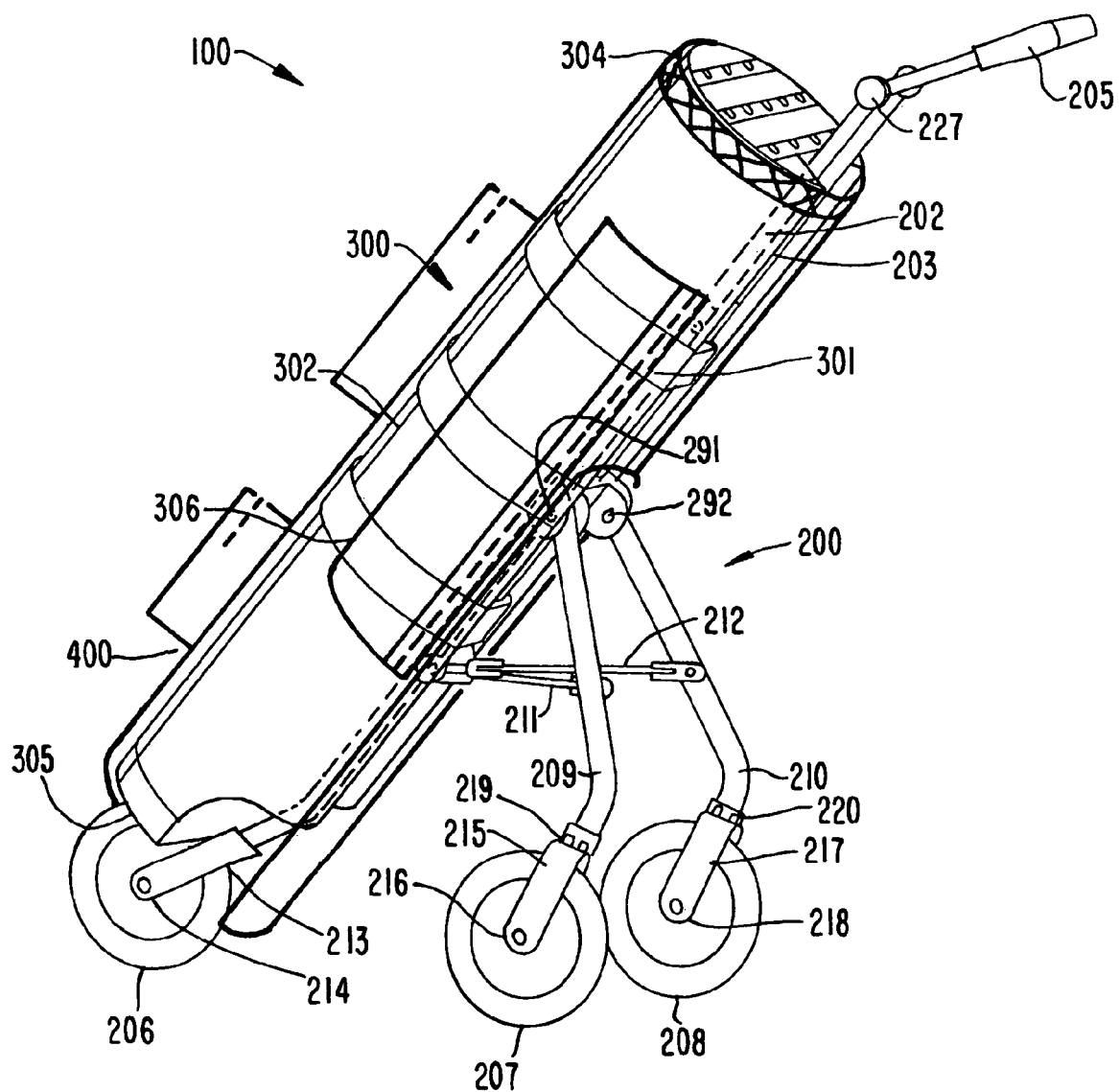
FIG. 7 illustrates a perspective view of the golf bag assembly of the present invention, replete with upholstered outer covering, with the multiple wheel integral transportation system in a deployed position.

Turning now to FIG. 6, a steering handle 205 is connected to the proximal end of the two outside transient rods 202, 203. When the steering handle 205 ascends from its retracted position below the top cylindrical ring 304 of the bag 101, the gear system 204 causes the center transient rod 201 to descend. At the same time, the two outside transient rods 202, 203 ascend in unison with the steering handle 205.

When the steering handle 205 is caused to ascend, the forward wheel 206 connected to the distal end of the center transient rod 201, and the rear wheels 207, 208 connected to rear legs 209, 210, that, in turn, are connected by articulating support braces 211, 212 to the outside transient rods 202, 203, deploy from their respective recessed stowage compartments 102, 103, 104 (shown in FIG. 9) beneath the bottom panel forming the base 305 of the bag.

Figure 16:
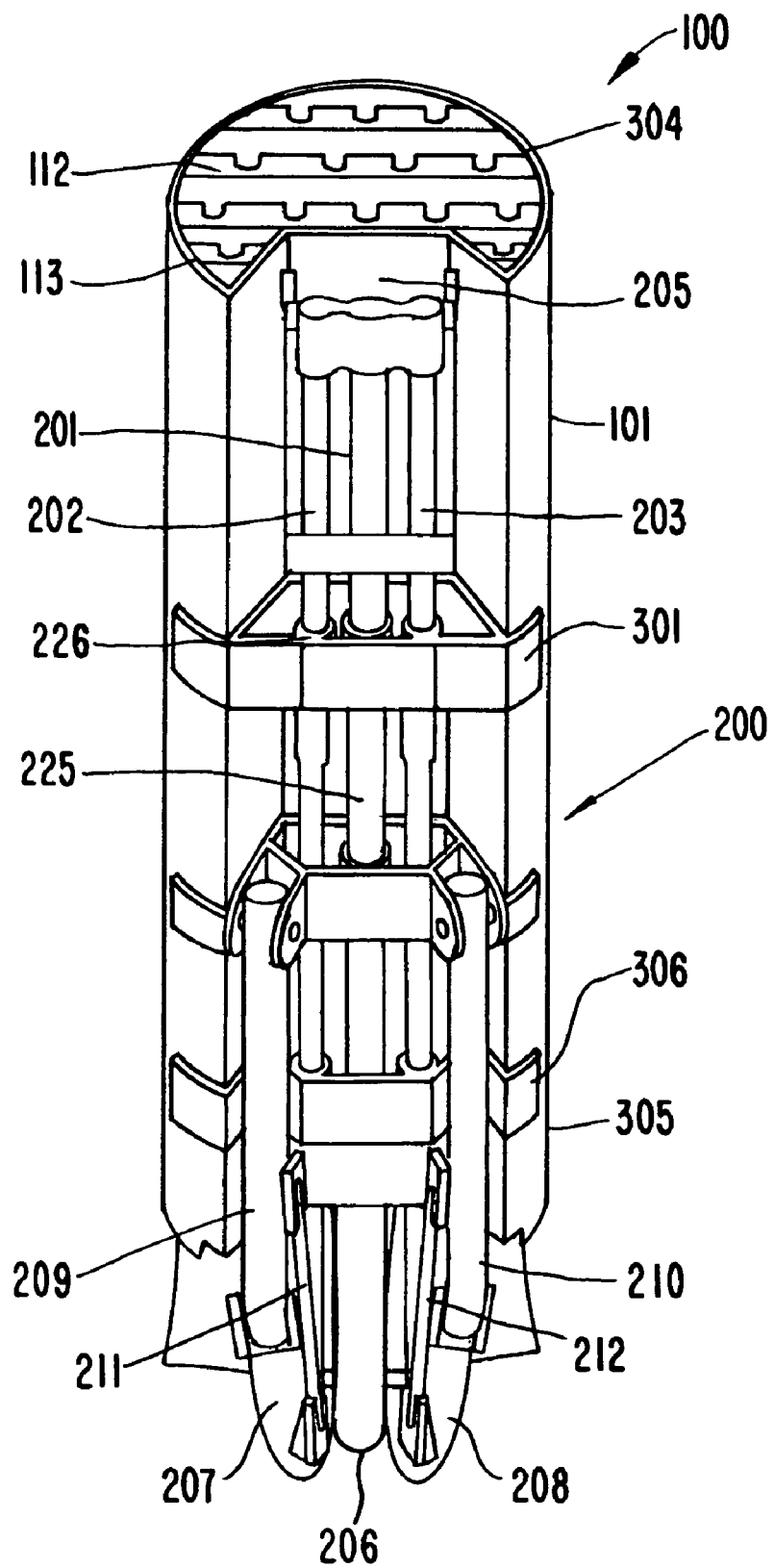
FIG. 16 illustrates a rear profile view of an alternative embodiment of a golf bag assembly of the present invention with a two wheel integral transportation system in the retracted position.
Figure 17:
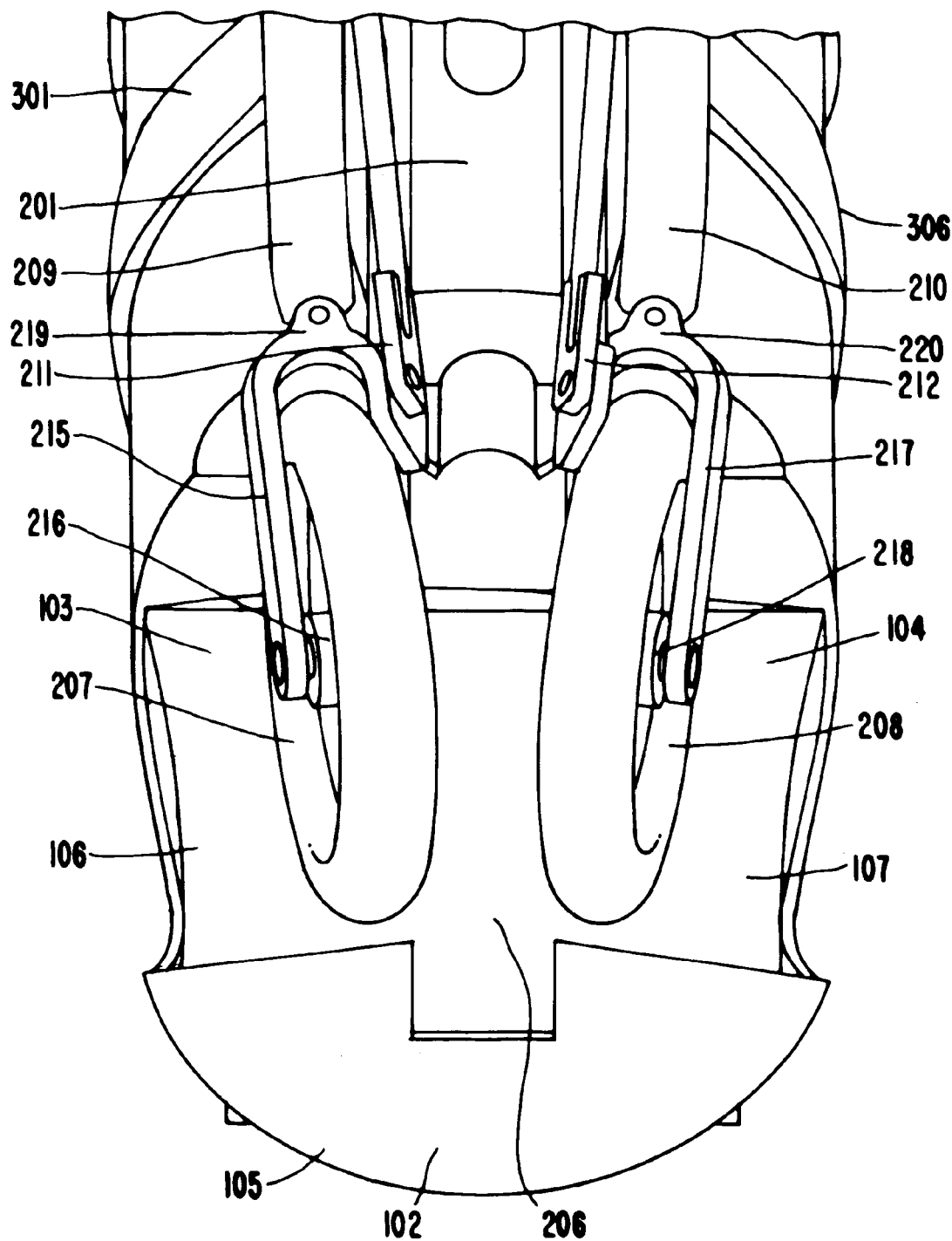
FIG. 17 illustrates an enlarged view of an alternative embodiment of a golf bag assembly with a two wheel integral transportation system in a retracted position.

As shown in FIG. 16, a spring 225 encircles the center transient rod 201 and is compressed against the lowest latitudinal band 306 when the integral transportation system 200 is retracted. The spring 225 releases when the steering handle 205 and the outside transient rods 202, 203 ascend, and, in turn, creates force to assist in the deployment of the rear legs 209, 210 and the wheels 207, 208 connected to the rear legs 209, 210.

Figure 11:
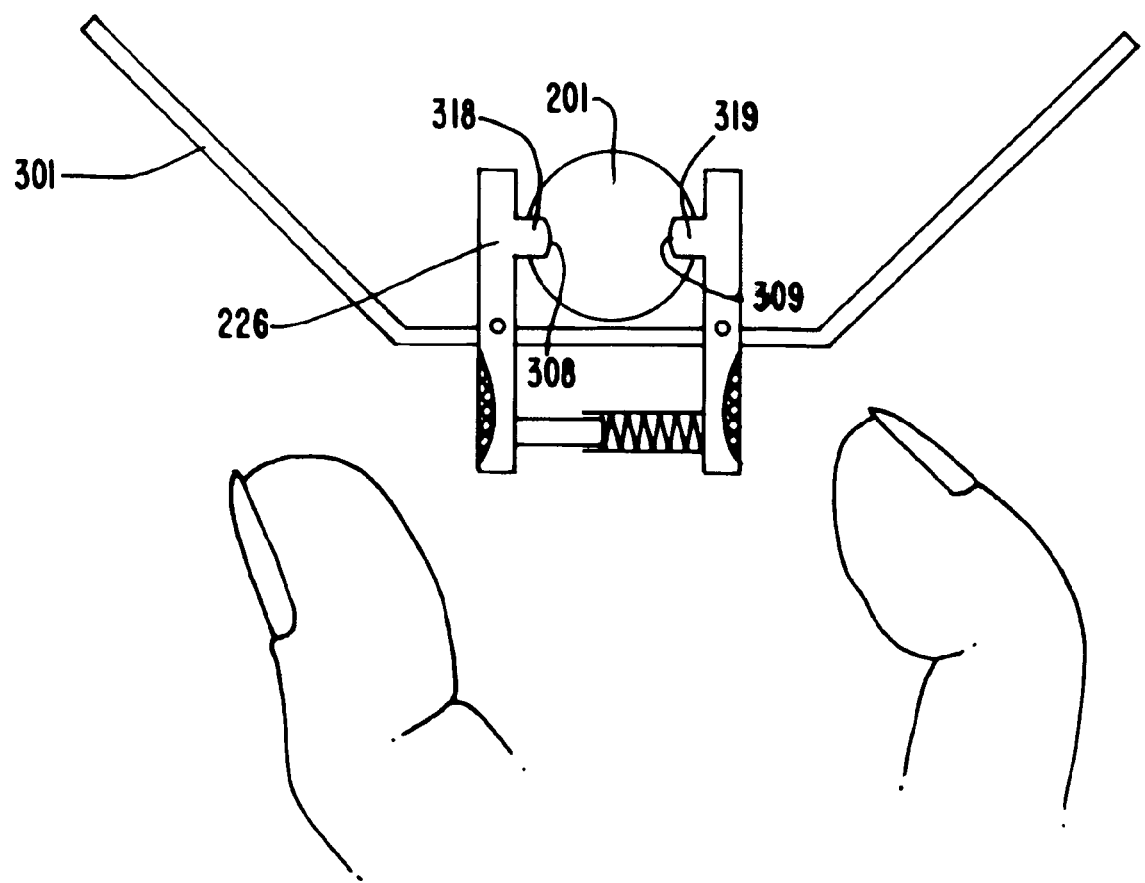
FIG. 11 illustrates the spring loaded locking mechanism on the golf bag assembly of the present invention for locking and restraining the integral transportation system in a fully deployed or fully retracted position.

As also shown in FIG. 11, to maintain the integral transportation system 200 in a fully retracted or deployed position, and to prevent the system from inadvertently opening or closing, a spring loaded locking mechanism 226 is fastened or affixed, for example, by rivets or other fasteners to the top side of the highest latitudinal band 301. The spring-loaded locking mechanism 226 includes plugs 318, 319 on each side of the spring loaded locking mechanism 226 for insertion into openings located in the sides of the center transient rod 201. One pair of openings 308, 309 exists toward the distal end of the center transient rod 201, into which the plugs 318, 319 for the spring loaded locking mechanism 226 are inserted to secure the integral transportation system 200 in the fully deployed position. The second pair of openings (not shown) exists toward the proximal end of the center transient rod 201 to secure the integral transportation system 200 in the fully retracted position. Of course the spring-loaded mechanism 226 may also be located in such position as to be used to lock outside transient rods 202, 203 in addition to center transient rod 201 or instead of center transient rod 201 depending upon the desired geometry of the golf bag assembly 100.

Figure 13:
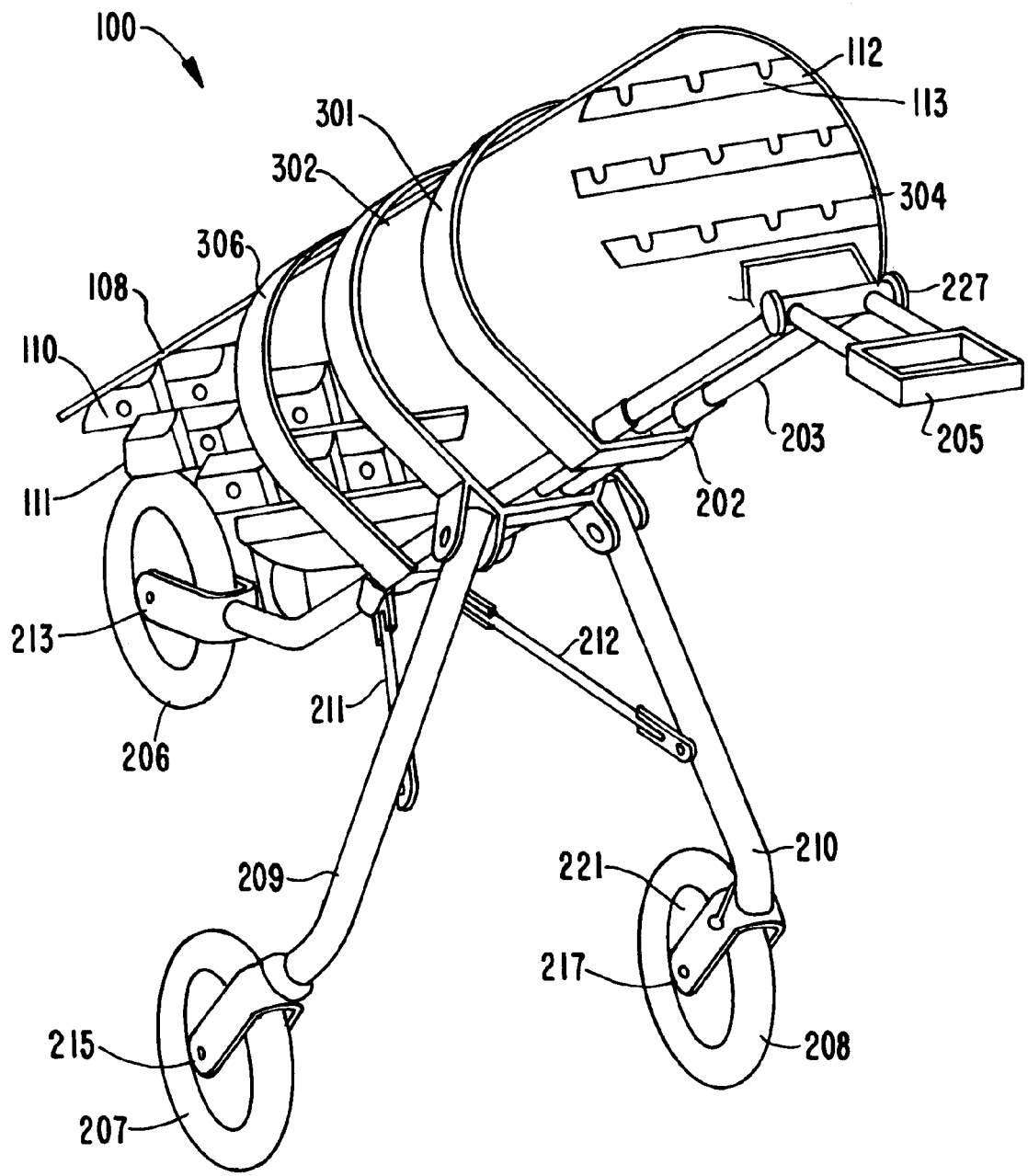
FIG. 13 illustrates an above view of an embodiment of the club storage configuration incorporated in the golf bag assembly of the present invention and the upper ring or collar of the bag.

As shown in FIG. 13, the steering handle 205 is essentially rectangular in shape. Its vertical and horizontal components, which, for example, can be constructed from a strong and rigid lightweight metal or plastic. Its inner opening is sized to permit a hand to easily grasp the steering handle 205 from almost any angle. Its rectangular shape allows the golfer to exert force upon the golf bag assembly 100 from a multitude of directions in order to push or pull the assembly. Alternate embodiments of the steering handle 205 in the shape of a pull lever with or without the incorporation of a cross-sectional member at the proximal end, or in an oval or elliptical shape, are also possible.

As also shown in FIG. 13, near the proximal ends of the outside transient rods 202, 203 and beneath the steering handle 205 is an articulating joint 227 that allows for at least 70 degrees of rotation and is capable of being unlocked and locked to adjust the height of the steering handle to a level that the golfer finds both comfortable and effective for actuating movement of the golf bag assembly 100. A side view of articulating joint 227 is also shown in FIG. 6.

As further depicted in FIG. 6, the forward wheel 206 is attached to the distal end of the center transient rod 201 using a sheath 213 made of, for example, strong and rigid lightweight plastic or metal that is intersected by an axle 214 on which the wheel 206 rotates. The two rear wheels 207, 208 are attached to the distal ends of their respective legs 209, 210 using sheaths 215, 217 made of, for example, strong and lightweight plastic or metal that are intersected by axles 216, 218 on which the wheels 207, 208 rotate. The sheaths 215, 217 for the rear wheels 207, 208 are attached to the distal ends of the legs 209, 210 with hinges 219, 220 that allow for limited movement of the sheaths 215, 217 and wheels 207, 208 in a horizontal direction.

As further shown in FIG. 6, the hub and tire of the forward wheel 206 and the hubs and tires of the two rear wheels 207, 208 can be made in various diameters depending upon the overall size of the golf bag assembly 100. The hub and tire of the forward wheel 206 and the hubs and tires of the two rear wheels 207, 208 can be constructed, for example, from a rubber, plastic, polymer or other strong, lightweight and impact resistant materials that can support the forces or loads imposed on or by the golf bag assembly 100, replete with clubs, golf accessories and personal items, without experiencing any significant deformation. The forward wheel 206 and the two rear wheels 207, 208 will generate a low coefficient of friction when rolled, and will be durable and not subject to degradation as a result of exposure to organic and non-organic materials and substances typically found on golf courses.

Additionally, the articulating support braces 211, 212 can be constructed, for example, from plastic, polymer, metal or other strong and lightweight materials. The braces 211, 212 at their upper terminus are connected by hinge or other articulating joint to the outside transient rods 202, 203, and the braces at their lower terminus are connected by hinge or other articulating joint at or near the mid-point of the rear legs 209, 210. The braces 211, 212 reinforce and enhance the stability of the rear legs 209, 210. Additionally, the braces 211, 212 assist in absorbing and transferring shock and other forces from the rear wheels 207, 208 and rear legs 209, 210 to the internal structural system 300 of the bag assembly 100.

Figure 9:
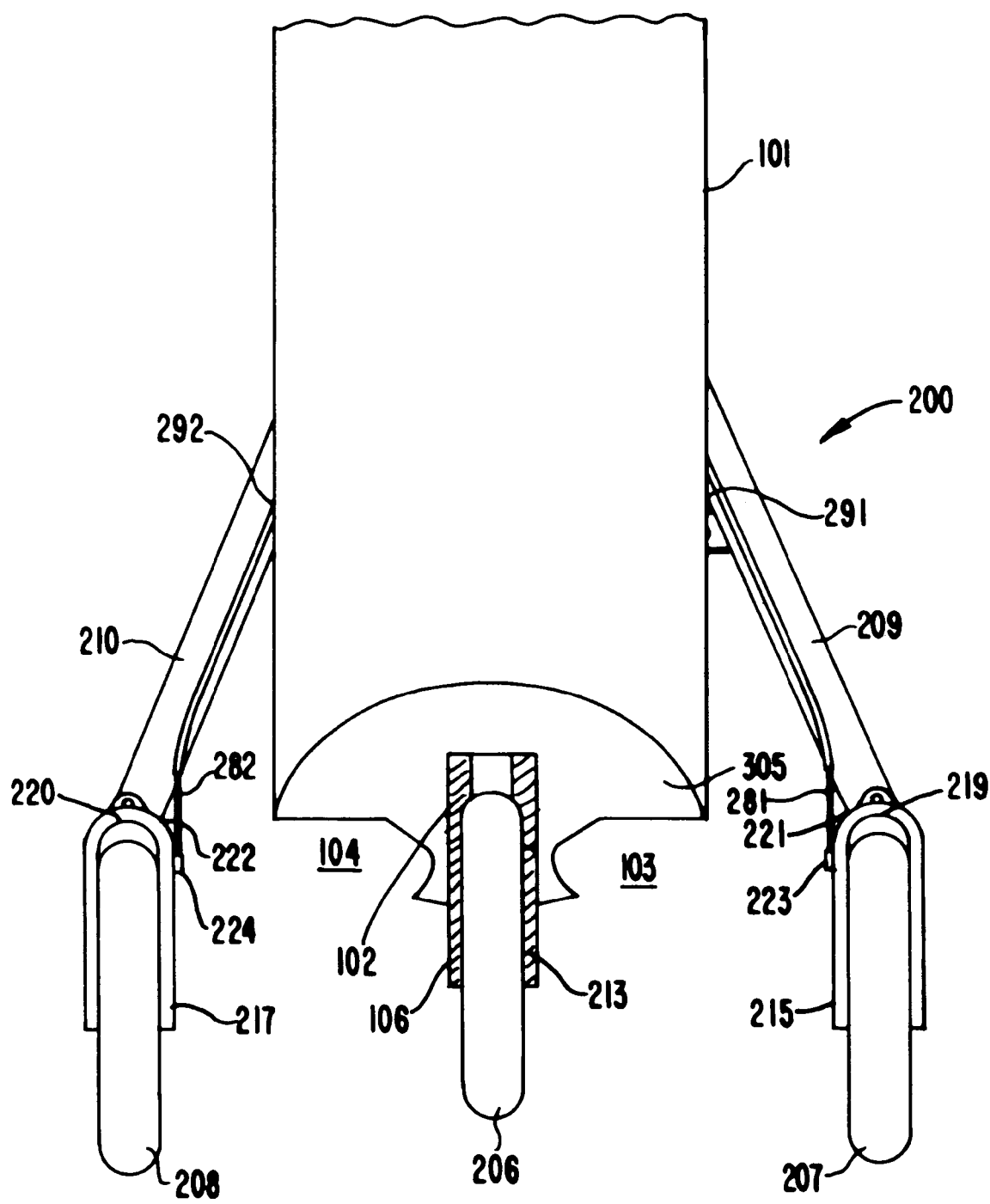
FIG. 9 illustrates a prospective rear view of the relative positions of the bag, wheels, legs, wheel alignment system and other structural components of the golf bag assembly of the present invention after the multiple wheel integral transportation system is deployed.
Figure 10:
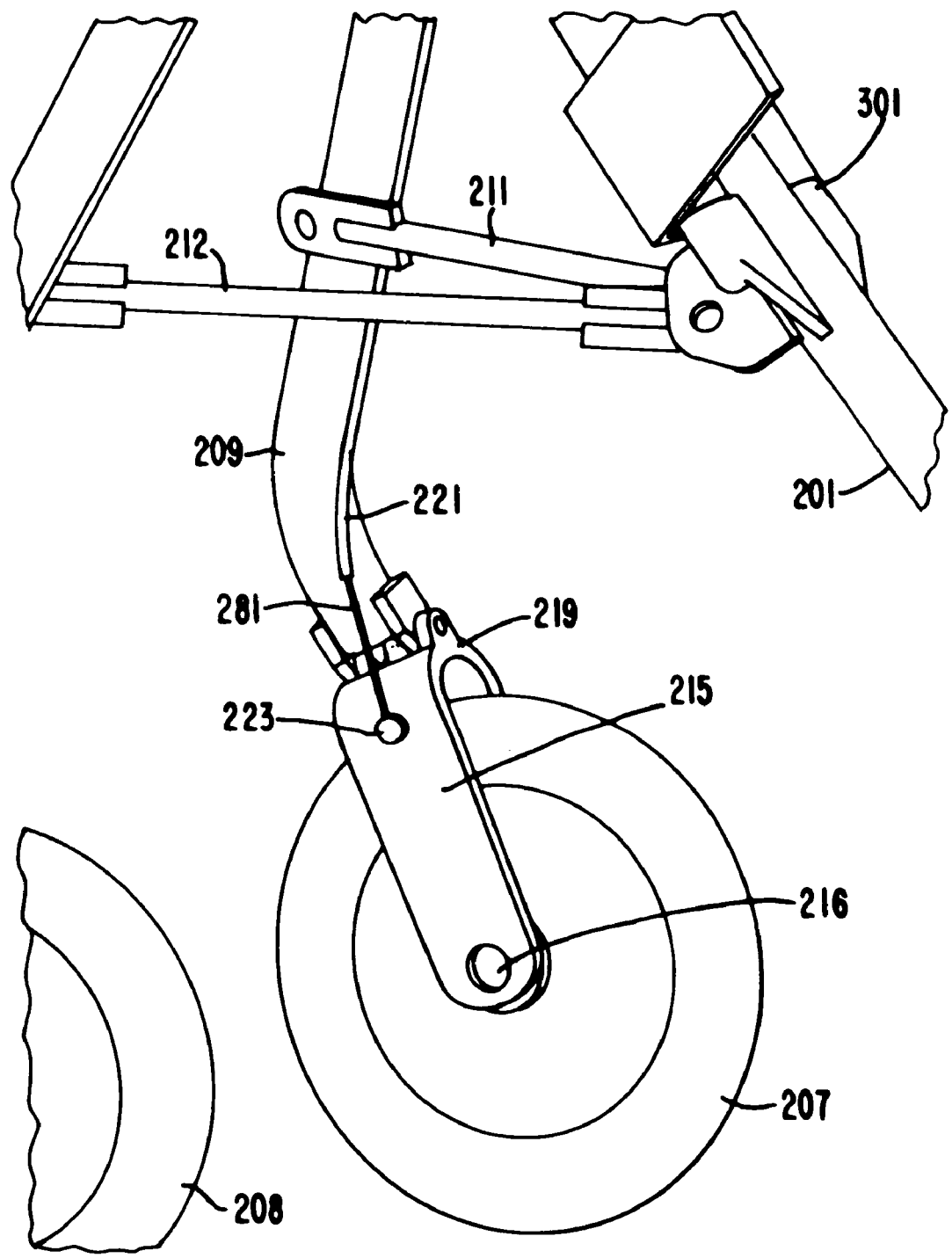
FIG. 10 illustrates an enlarged view of a rear wheel and other structural components of the golf bag assembly of the present invention after the wheel alignment system has aligned the rear wheels in a plane parallel to the sides of the golf bag and vertical to the ground surface.

As shown in FIG. 9, the integral transportation system 200 includes a wheel alignment system 221, 222, consisting of a cable, wire or other tether 281, 282 that attaches to the flanges 291, 292 where the proximal ends of the rear legs 209, 210 are connected. The cable, wire or tether 281, 282 runs through the interior of the tubing forming the rear legs 209, 210 or in sheaths 215, 217 connected to the outer wall of the rear legs 209, 210. The cable, wire or tether 281, 282 terminates at the inner side of the sheaths 215, 217 holding each rear wheel 223, 224. As the rear legs 209, 210 move from the retracted to the deployed position, the cable, wire or tether 281, 282 that operates in conjunction with each rear leg 209, 210 becomes taut. The stress placed on the cable, wire or tether 281, 282 causes the sheaths 215, 217 holding the rear wheels 207, 208 to align themselves in a position parallel to the outer sides of the bag 101. When the rear wheels 207, 208 are retracted, the cable, wire or tethers 281, 282 become slack, resulting in each rear wheel 207, 208 pivoting slightly inward in order to be received by each wheel's respective stowage compartment 103, 104 beneath the bottom panel forming the base 305 of the bag 101. A close-up view of the tether assembly used on rear leg 209 is shown in FIG. 10.

When the forward wheel 206 and the rear wheels 207, 208 are in the fully deployed position, the golf bag assembly 100 can be rolled, by either pushing or pulling it, to traverse the natural ground, grass, asphalt or concrete pavement, stone, gravel, shell, brick and wooden planks or boards, as well as both organic and non-organic ground cover, such as straw, bark, stone, rocks, sand and other materials that are typically found on golf courses.

As shown in FIG. 3 and FIG. 6, when the steering handle 205 descends from its deployed position (shown in FIG. 6) to its retracted position (shown in FIG. 3), the gear system 204 causes the center transient rod 201 to ascend. At the same time, the two outside transient rods 202, 203 descend and retract in unison with steering handle 205. As the center transient rod 201 ascends, the forward wheel 206 connected to the sheath 213 that is connected to the distal end of the center transient rod 201 returns to its recessed stowage compartment 102. Simultaneously, the outside transient rods 202, 203 cause the articulating support braces 211, 212 to articulate downward and transfer sufficient force to pull the rear legs 209, 210, to which the rear wheels 207, 208 are attached, toward the bag 101, whereupon the rear wheels 207, 208 are returned to their respective recessed stowage compartments 103, 104. The integral transportation system 200 and the associated components are shown in a fully retracted position in FIG. 5.

Figure 5:
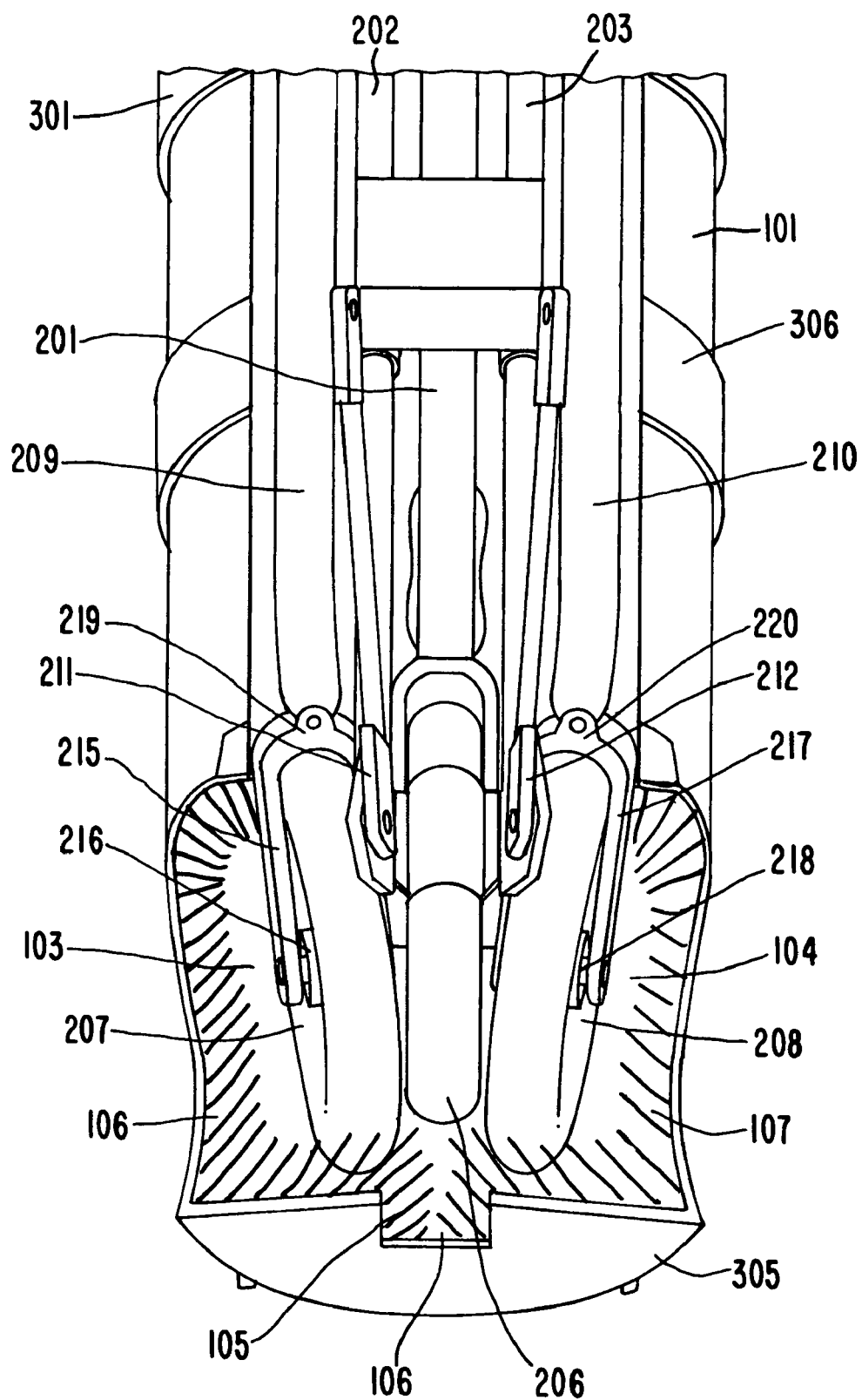
FIG. 5 illustrates an enlarged rear view of the wheel system of the golf bag assembly of the present invention showing the wheels in a retracted position.

As further shown in FIG. 5, the stowage compartment 102 for the forward wheel 206 is surrounded by vertical panels made, for example, from a plastic, polymer or other strong, lightweight and impact resistant material and is located beneath the center of the bottom panel forming the base 305 of the bag. The stowage compartments 103, 104 for the rear wheels 207, 208 are located beneath the bottom panel of the bottom panel of the base 305 between the plane forming the circumference of the bag 101 and the side panels of the stowage compartment 102 for the forward wheel 206. Because each rear wheel 207, 208 has its own axle 216, 218, as opposed to the two rear wheels 207, 208 sharing a common axle, the rear legs 209, 210 and rear wheels 207, 208 articulate independent of the other. As a result, each rear wheel 207, 208 can be stowed in its own recessed stowage compartment 103, 104 at the base 305 of the bag 101.

As shown in FIGS. 3, 4, 5, 16 and 17, when the integral transportation system 200 is in a retracted position, none of the wheels 206, 207, 208 and their associated components extends beyond the vertical bounds of the golf bag assembly 100. This unique geometry reduces the operational hazards associated with transferring the golf bag assembly 100 in and out of a vehicle trunk or hatch; allows for the placement of the golf bag assembly 100 on the platforms attached to the rear of motorized carts; is dimensionally compatible with conventional storage racks, binds, lockers, trucks, platforms or other similar storage configurations typically found in and around golf courses and residences; and fits within traditional golf travel cover containers and systems.

As further shown in FIG. 5, brushes 105, 106, 107 or other frictional devices surround the passageway to the bottom of the stowage compartment 102 for the forward wheel 206 as well as the rear of the stowage compartments 103, 104 for the two rear wheels 207, 208. The brushes 105, 106, 107 or other frictional devices come in contact with the wheels 206, 207, 208 as each wheel is retracted following use. Through physical agitation, the brushes 105, 106, 107 dislodge or otherwise remove dirt, debris and other particles from the wheels 206, 207, 208.

Figure 12:
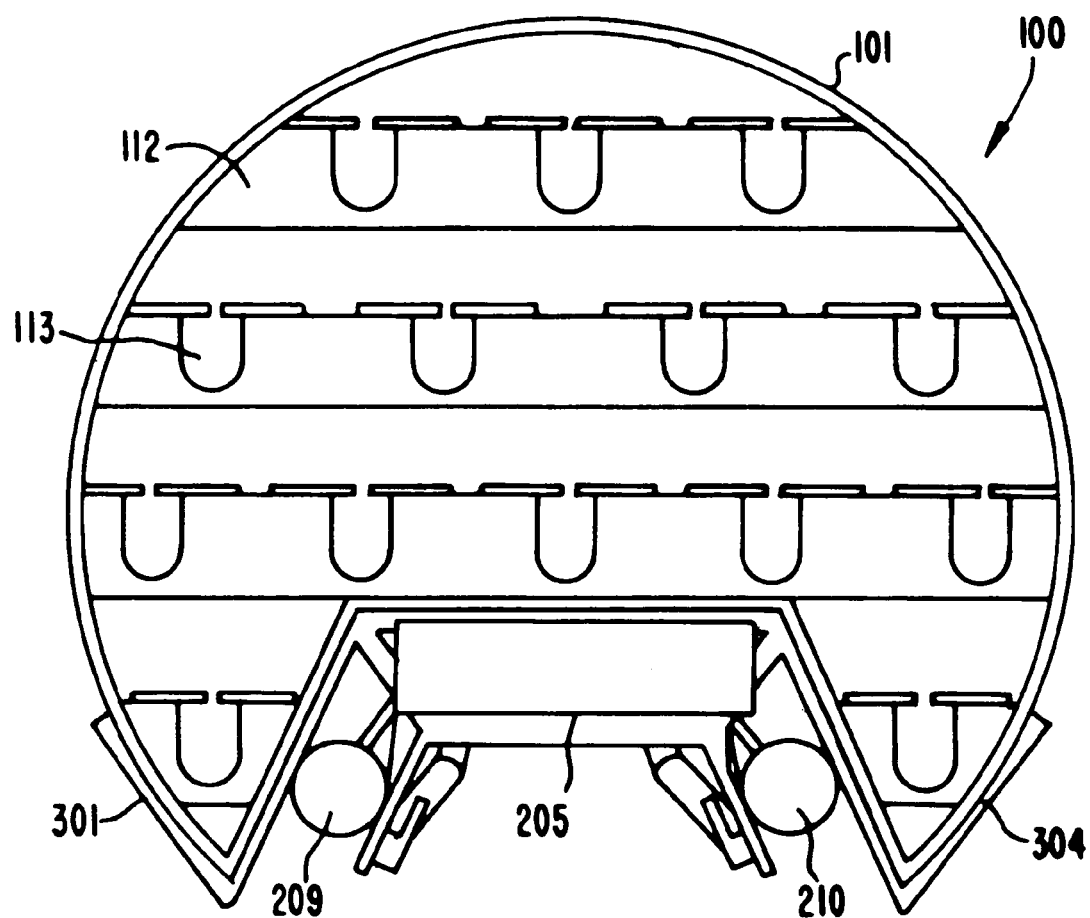
FIG. 12 illustrates a fragmentary view of the golf bag assembly of the present invention showing the vertical members of the internal structural system in the front quadrants of the bag, and the manner in which the vertical members intersect the latitudinal bands placed to provide rigidity and structural support to the bag.

As shown in FIG. 12, the top cylindrical ring or collar 304 of the bag assembly 100 contains dividers 112 that intersect the inner circumference of the bag 101 in a side-to-side direction. The dividers 112 include openings 113 in a semi-circular or other shape for the placement of clubs to restrain the movement of the clubs at the shaft and thereby prevent the clubs from contacting one another.

Figure 14A:
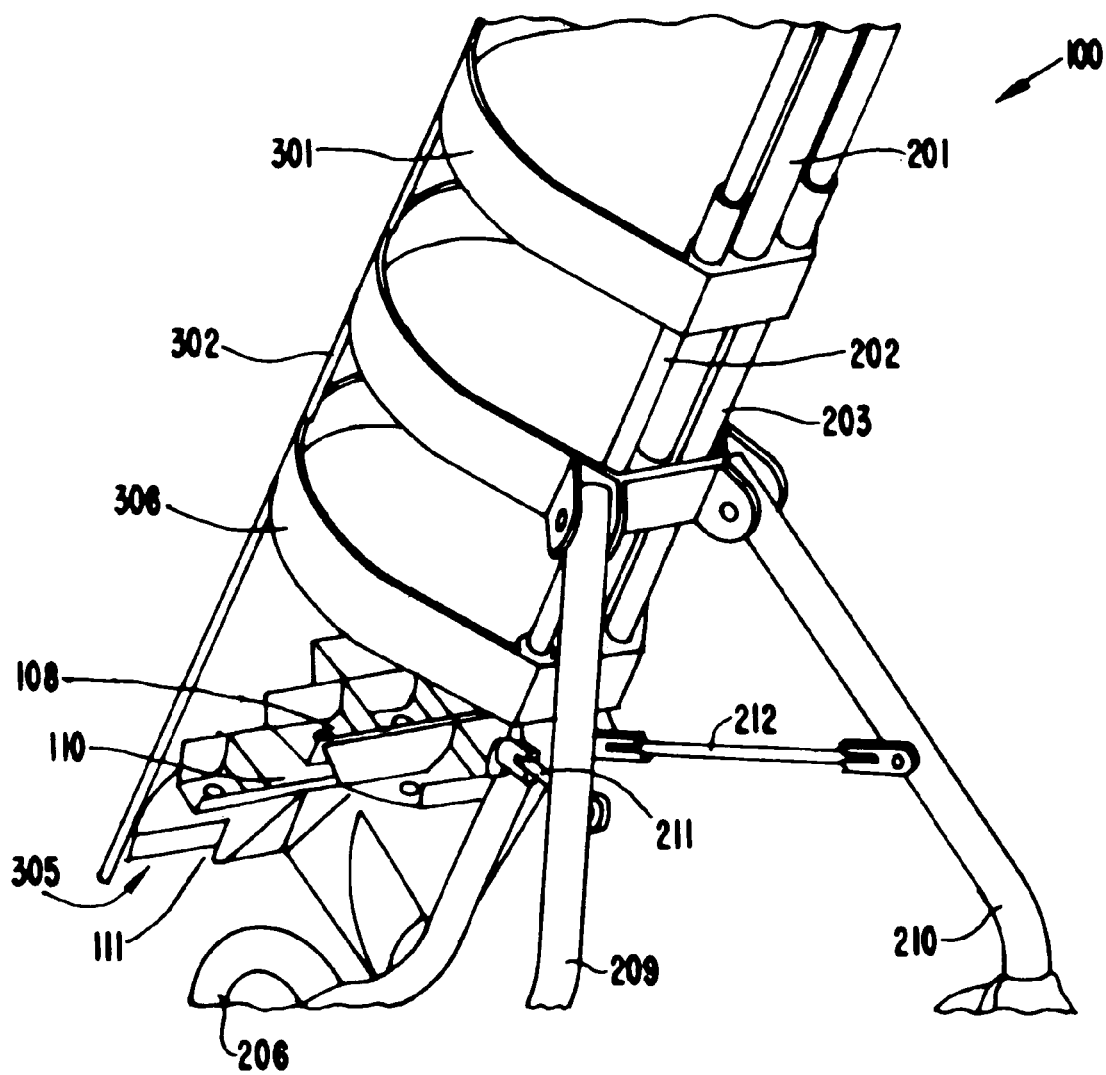
FIG. 14 illustrates a cross-sectional elevation of an embodiment of a golf bag assembly of the present invention showing the relative position of the wheel stowage compartments to the bottom panel forming the base of the bag.
Figure 14B:
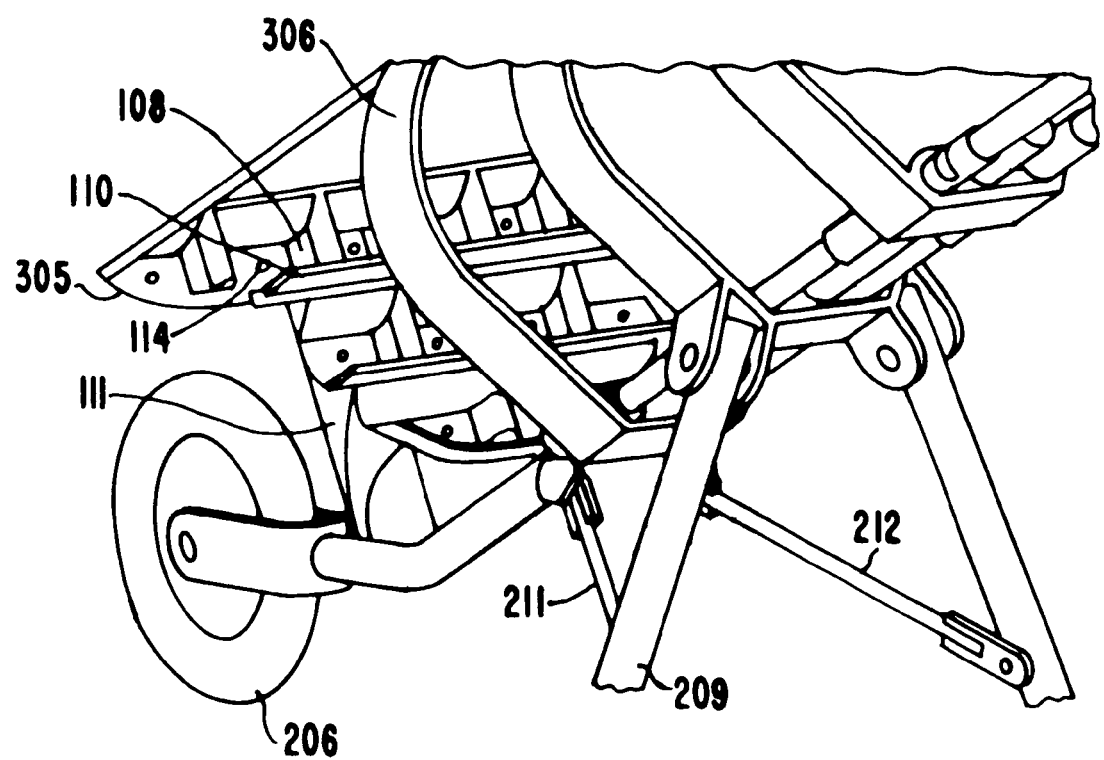

As shown in FIG. 14A and in FIG. 14B, the top side of the bottom panel forming the base 305 of the bag contains an assortment of compartments 108 of sufficient length, width or diametrical dimensions to accept and restrain the grip ends of clubs and thereby deter lateral movement in the grip ends of clubs, when the golf bag assembly 100 is lifted, carried or rolled. The compartments 108 can be constructed in a square, rectangular or circular shape from, for example, a plastic, polymer or other strong, lightweight and impact resistant material. As best shown in FIG. 14B, each compartment 108 has a floor 114 that is sloped or angled to a center point 110. A perforation through the bottom panel of the base 305 of the bag 101 exists at the center point 110 of each compartment 108 to facilitate ventilation of the club storage area, the drying of grip ends of clubs and the drainage of the compartments 108 in the event of inclement weather.

Figure 15:
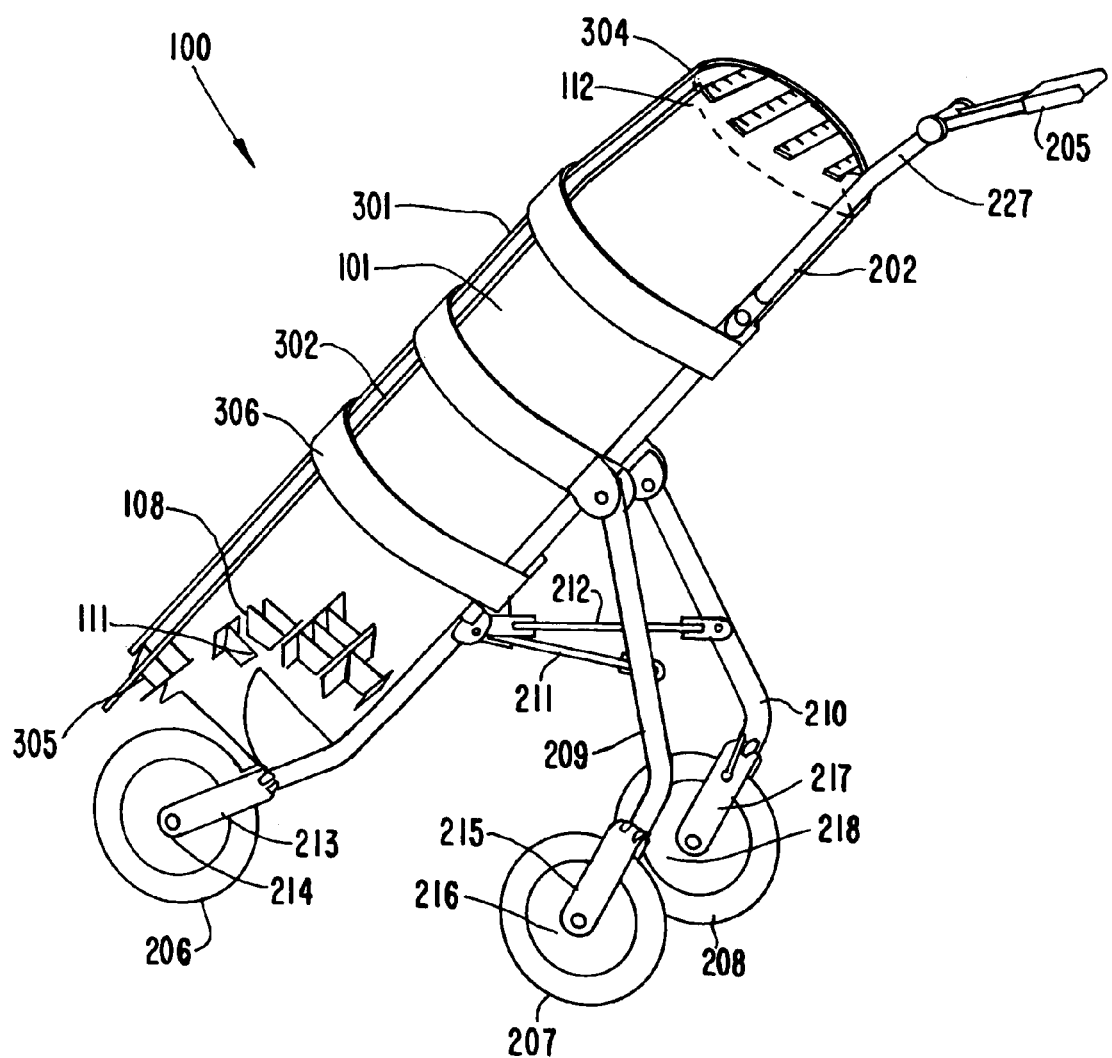
FIG. 15 illustrates a cross-sectional fragmentary view of an embodiment of the bottom panel forming the base of the golf bag assembly of the present invention showing the individual compartments that will receive the grip ends of the clubs, in addition to the sloped floor and perforations in each grip end compartment to facilitate the ventilation and drainage of the club storage area and to promote the drying of grip ends.

As shown in FIG. 15, the top side of the bottom panel of the base 305 of the bag 101 is sloped from the rear to approximately midway between the mid-line and front of the bag. Likewise, the compartments 108 for the grip ends of the clubs are situated along the same slope. The slope in the bottom panel of the base 305, and in turn, the compartments 108 comprising the top side of the bottom panel of the base 305 allow for the storage of shorter clubs at a height near or equal to the height of longer clubs.

Figure 4:
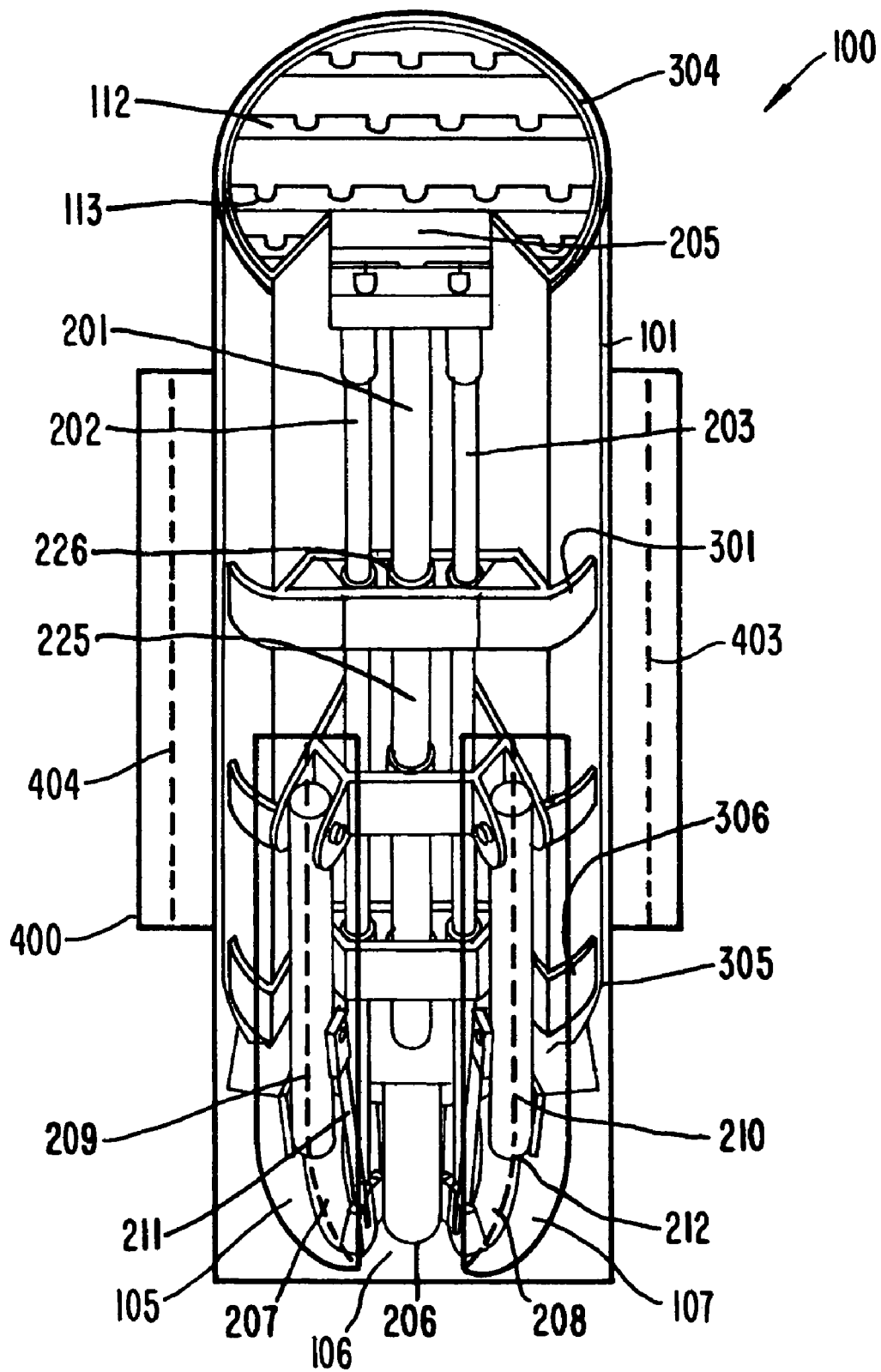
FIG. 4 illustrates a rear profile view of the golf bag assembly of the present invention, replete with upholstered outer covering, with the multiple wheel integral transportation system in the retracted position.

FIG. 2 and FIG. 4 illustrate a preferred embodiment of the present invention with upholstery 400. The upholstery 400 for the bag assembly 100 may be constructed of any durable and lightweight material such as, for example, plastic, nylon, polypropylene, canvas, fabric, or other similar material that can withstand natural elements and the terrain and substances normally encountered on a golf course. The upholstery 400 envelopes the integral transportation system 200 when the system 200 is in the retracted position. Passages in the upholstery located in the rear side of the bag, that can be opened and closed with zippers 401, 402, 403, 404 or other devices, permit the deployment of the rear wheels 207, 208 and associated equipment of the integral transportation system 200. The upholstered compartment 410 for the steering handle 205 likewise can be opened and closed with a zipper or other device, when the integral transportation system 200 is in the retracted position.

The golf bag assembly of the present invention may incorporate the attachment of carrying straps or hand grips on the outer circumference of the bag that a golfer or caddy can utilize to carry the golf bag assembly when the golfer chooses not to deploy the integral transportation system or to mount the golf bag assembly on a platform attached to the rear of a motorized cart.

The golf bag assembly of the present invention may be embodied in a traditionally shaped circular, oval or elliptical geometry, or in a non-traditionally shaped rectangular, square or similarly configured bag or container, or a combination of two or more of these shapes.

Figure 18:
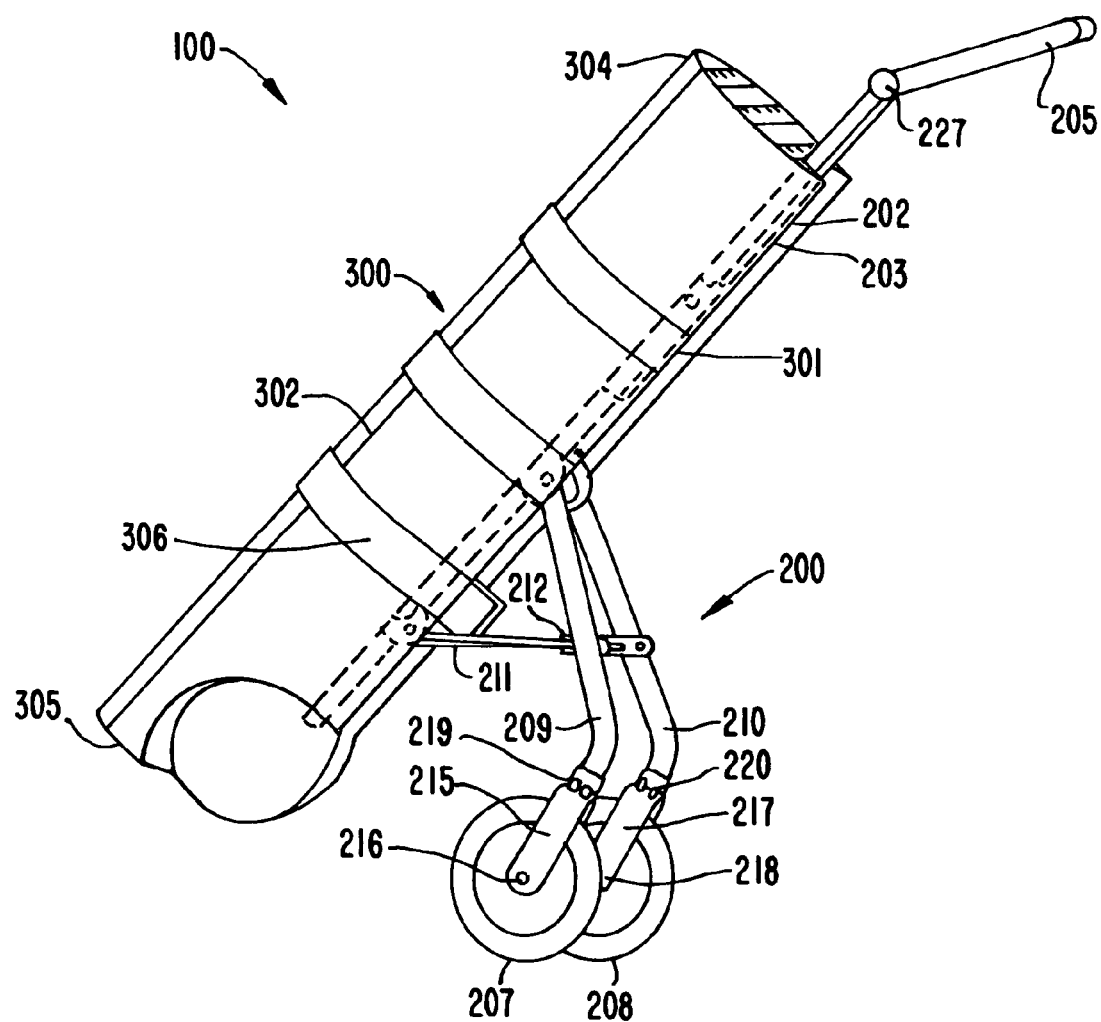
FIG. 18 illustrates a perspective view of an alternative embodiment of the golf bag assembly of the present invention with a two wheel integral transportation system in a deployed position.
Figure 19:
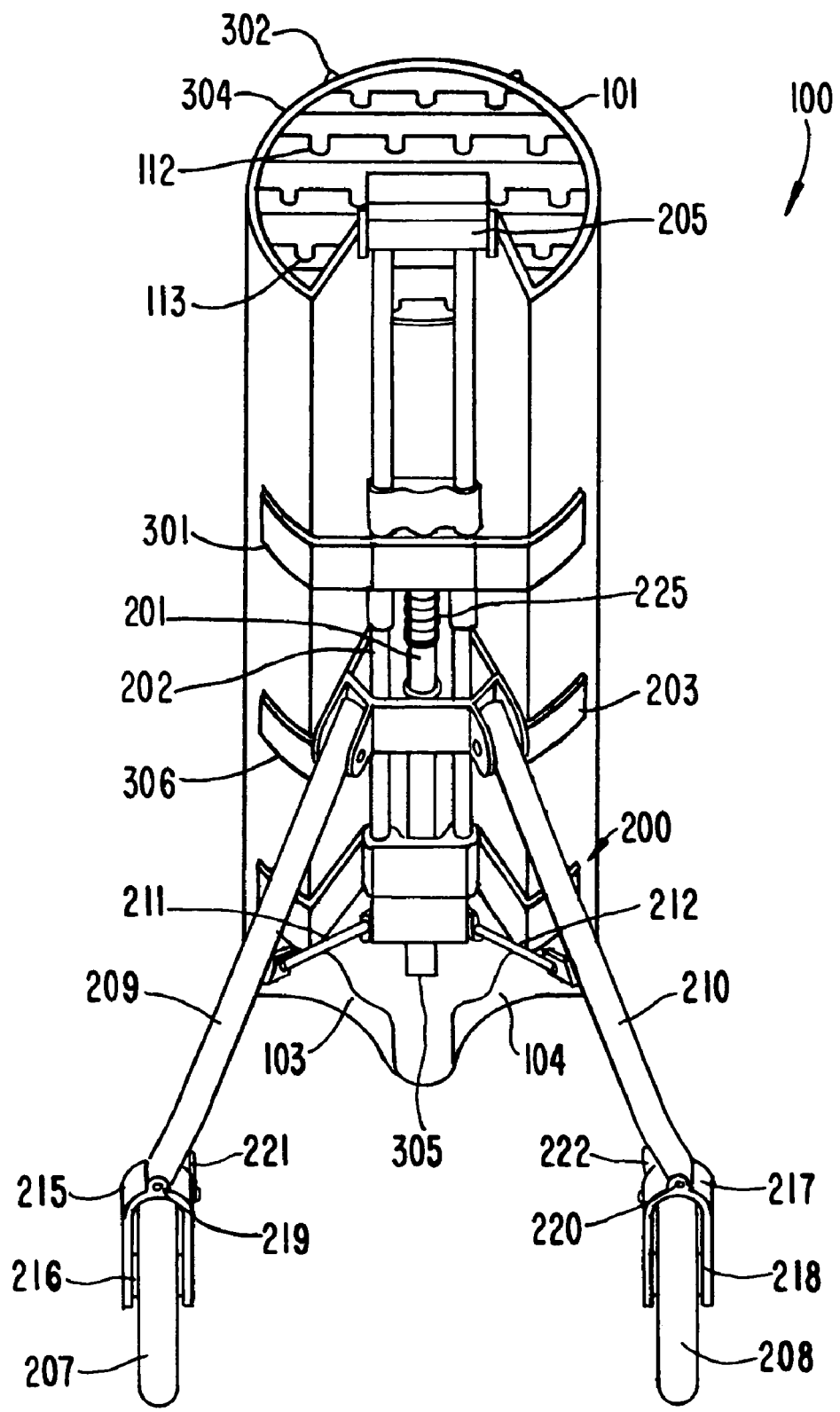
FIG. 19 illustrates the relative position of the bag, wheels, legs, wheel alignment system and other structural components of an alternative embodiment of a golf bag assembly of the present invention after the two wheel integral transportation system is deployed.

An alternative embodiment of the golf bag assembly of the present invention is depicted in FIG. 18 that utilizes an integral transportation system consisting of two rear wheels. The club storage features of the alternative embodiment are substantially the same as those of the exemplary embodiment discussed above.

Additional embodiments of the golf bag assembly of the present invention may incorporate any number of supplementary features used to assist a golfer or caddy during a round of golf. Additional features contemplated include, but are not limited to, a motor driven mechanism to provide assistance in overcoming initial and other frictional forces encountered in connection with the movement of the golf bag assembly.

The golf bag assembly of the present invention can include a global position device (GPS) to provide accurate distance and location measurements to golfer while engaged in playing a round of golf. Other features include dedicated range finders, mobile computing devices, and mobile communication devices. These features may be powered by a rechargeable battery or by a solar or mechanical generator coupled to the wheel system of the present invention. FIG. 2 schematically shows use of some of these devices. Sports equipment bag 100 can include a positioning device 1000 to provide accurate distance and location measurements, or to acquire or store data. Sports equipment bag 100 can include an energy storage system 1010 to produce and store an electric charge to power the positioning device 1000. Sports equipment bag 100 can include a motor drive mechanism 1100 coupled to the integral transportation system 200 to assist in moving the sports equipment bag 100. Sports equipment bag 100 can include a generator and an energy storage system 1110 to produce and store an electric charge to power the motor drive mechanism 1100. Generator and energy storage system 1110 can include a solar cell.

While the present invention has been described in connection with a number of exemplary embodiments and implementations, the present invention is not so limited. Rather, the present invention also covers various modifications and equivalent arrangements that would fall within the purview of appended claims.

What is claimed is:

1. A sports equipment bag assembly, comprising:
   a bag;
   a structural system to provide support and structural integrity for the bag; and
   an integral transportation system coupled to the structural system, the integral transportation system including a wheel system that is completely contained within the geometry of the bag when the wheel system is in a retracted state, further comprising a deployment mechanism to deploy the wheel system from a retracted state to a deployed state, and to retract the wheel system from a deployed state to a retracted state.

2. The sports equipment bag assembly of claim 1, wherein the deployment mechanism includes a steering handle.

3. The sports equipment bag assembly of claim 2, wherein the structural system includes a latitudinal band about the circumference of the bag to provide rigidity and support to the bag.

4. The sports equipment bag assembly of claim 3, wherein the structural system includes a vertical member extending in the longitudinal direction of the bag, and intersecting the latitudinal band, and connecting at an upper terminus to a top ring of the bag and connecting at a lower terminus to a base of the bag.

5. The sports equipment bag assembly of claim 4, wherein the base is perforated to facilitate ventilation of a storage compartment of the bag assembly and the drying of contents in the storage compartment.

6. The sports equipment bag assembly of claim 4, wherein the sports equipment bag is a golf bag for at least one of transport, protection, and storage of golf clubs.

7. The sports equipment bag assembly of claim 4, wherein the top ring includes a divider with a retainer for the placement of the shafts of golf clubs to limit movement of the golf club heads and golf club shafts to prevent the golf clubs from contacting one another.

8. The sports equipment bag assembly of claim 4, wherein the base of the bag includes a bottom panel with a scalloped opening to provide a recessed stowage area to accommodate multiple wheels when the wheels are in a retracted position.

9. The sports equipment bag assembly of claim 8, wherein an upper side of the bottom panel of the base of the bag is sloped with a substantially similar profile to the scalloped opening to elevate the heads of shorter elongated devices to a height that is substantially similar to the height of the heads of longer elongated devices.

10. The sports equipment bag assembly of claim 9, wherein the upper side of the bottom panel of the bag includes shaped compartments to accept and restrain the end of an elongated device.

11. The sports equipment bag assembly of claim 10, wherein the elongated device is a golf club.

12. The sports equipment bag assembly of claim 10, wherein the shaped compartments include a perforated floor to facilitate the ventilation of the bag, the drying of elongated devices, and drainage of the bag in the event of inclement weather.

13. The sports equipment bag assembly of claim 6, wherein the bag includes a storage compartment for golf clubs or other elongated devices in which a golf club or other elongated device is inserted for storage and removed for use.

14. The sports equipment bag assembly of claim 13, wherein the elongated device is a golf club that is inserted for storage and removed for use.

15. The sports equipment bag assembly of claim 13, wherein the storage compartment includes a top opening with a diameter of at least eight inches.

16. The sports equipment bag assembly of claim 2, further comprising a positioning device to provide accurate distance and location measurements, or to acquire or store data.

17. The sports equipment bag assembly of claim 16, further comprising an energy storage system to produce and store an electric charge to power the positioning device.

18. The sports equipment bag assembly of claim 1, further comprising a motor drive mechanism coupled to the integral transportation system to assist in moving the sports equipment bag assembly.

19. The sports equipment bag assembly of claim 6, further comprising a motor drive mechanism coupled to the integral transportation system to assist in moving the sports equipment bag assembly.

20. The sports equipment bag assembly of claim 18, further comprising a generator and an energy storage system to produce and store an electric charge to power the motor drive mechanism.

21. The sports equipment bag assembly of claim 20, wherein the generator is a solar cell.

22. The sports equipment bag assembly of claim 19, further comprising a generator and an energy storage system to produce and store an electric charge to power the motor drive mechanism.

23. The sports equipment bag assembly of claim 22, wherein the generator is a solar cell.

24. A sports equipment bag assembly, comprising: a bag; a structural system to provide support and structural integrity for the bag; and an integral transportation system coupled to the structural system, the integral transportation system including a wheel system, wherein the integral transportation system includes a deployment mechanism to deploy the wheel system from a retracted state to a deployed state, and to retract the wheel system from a deployed state to a retracted state, wherein the deployment system is operatively connected to the wheel system by a gear system.

25. The sports equipment bag assembly of claim 24, wherein the deployment mechanism includes a steering handle.

26. The sports equipment bag assembly of claim 25, wherein the steering handle moves in a first direction to activate a force transfer device to deploy the wheel system and moves in a second direction opposite to the first direction to retract the wheel system.

27. The sports equipment bag assembly of claim 25, wherein the steering handle includes an adjustable handle portion to adjust the height of the steering handle when the integral transportation system is deployed.

28. The sports equipment bag assembly of claim 27, wherein the adjustable handle portion includes an articulating mechanism.

29. The sports equipment bag assembly of claim 27, wherein the adjustable handle portion includes a locking mechanism.

30. The sports equipment bag assembly of claim 24, wherein the deployment mechanism further comprises a first outside transient rod, a center transient rod, and a second outside transient rod to deploy and retract the wheel system.

31. The sports equipment bag assembly of claim 30, wherein the first outside transient rod, the center transient rod, and the second outside transient rod are supported by a latitudinal band.

32. The sports equipment bag assembly of claim 30, wherein the gear system engages serrations along the center transient rod and along an interior side of the first outside transient rod and along an interior side of the second transient rod.

33. The sports equipment bag assembly of claim 32, wherein the proximal end of the first outside transient rod and the proximal end of the second outside transient rod are connected to the steering handle.

34. The sports equipment bag assembly of claim 33, wherein as the steering handle is caused to move in a first direction, the gear system transfers forces and causes the center transient rod to move in a second direction opposite to the first direction.

35. The sports equipment bag assembly of claim 34, wherein the forward wheel is connected via a forward leg to the distal end of the center transient rod, and wherein a load resistant mechanism engages the center transient rod and is compressed against a latitudinal band when the integral transportation system is in a retracted position and releases to facilitate the deployment of the integral transportation system to a deployed position.

36. A sports equipment bag assembly, comprising: a bag; a structural system to provide support and structural integrity for the bag; and an integral transportation system coupled to the structural system, the integral transportation system including a wheel system, the wheel system having at least one forward wheel and a plurality of rear wheels and a deployment mechanism to deploy the at least one forward wheel and plurality of rear wheels of the wheel system from a retracted state to a deployed state, and to retract the at least one forward wheel and plurality of rear wheels of the wheel system from a deployed state to a retracted state.

37. The sports equipment bag assembly of claim 36, wherein the deployment mechanism is operatively connected to the wheel system by a gear system and the deployment system includes a steering handle and, as the steering handle is caused to ascend, the gear system transfers forces and causes the forward wheel and the rear wheels to deploy from recessed stowage compartments beneath the base of the bag.

38. The sports equipment bag assembly of claim 36, wherein the deployment mechanism is operatively connected to the wheel system by a gear system and the deployment system includes a steering handle and, as the steering handle is caused to descend, the gear system transfers forces and causes the forward wheel and the rear wheels to retract to recessed stowage compartments beneath the base of the bag.

39. The sports equipment bag assembly of claim 36, wherein the deployment mechanism further comprises a first outside transient rod and a second outside transient rod to deploy and retract the wheel system, wherein the rear wheels are connected via rear legs and articulating support braces to the first outside transient rod and the second outside transient rod, and wherein the proximal ends of the rear legs are attached to a latitudinal band of the structural system that allows the articulation of the legs in a vertical plane.

40. The sports equipment bag assembly of claim 36, wherein the rear wheels are connected via rear legs, each rear wheel having a first angular position relative to its respective rear leg when in a retracted state and a second angular position relative to its respective rear wheel when in an extended state, the second angular position being a different angle than the first angular position.

41. The sports equipment bag assembly of claim 40, wherein the deployment mechanism further comprises a first outside transient rod and a second outside transient rod to deploy and retract the wheel system, wherein the rear wheels are connected via rear legs and articulating support braces to the first outside transient rod and the second outside transient rod and the articulating support braces articulate in an outward direction when the deployment mechanism is deployed and an inward direction when the deployment mechanism is retracted.

42. The sports equipment bag assembly of claim 36, wherein the deployment mechanism further comprises a first outside transient rod, a center transient rod, and a second outside transient rod to deploy and retract the wheel system, wherein the forward wheel is connected via a forward leg to the distal end of the center transient, and wherein the forward wheel is connected to the distal end of the center transient rod using a sheath that is intersected by an axle on which the forward wheel rotates.

43. The sports equipment bag assembly of claim 36, wherein the deployment mechanism further comprises a first outside transient rod and a second outside transient rod to deploy and retract the wheel system, wherein the rear wheels are connected via rear legs and articulating support braces to the first outside transient rod and the second outside transient rod, and wherein the rear wheels are connected to the distal ends of their respective rear legs using a sheath that is intersected by an axle on which the rear wheel rotates.

44. The sports equipment bag assembly of claim 43, wherein the sheath for each rear wheel is attached to the distal end of each rear leg with a hinge that allows for limited movement of each sheath and each wheel in a horizontal plane.

45. The sports equipment bag assembly of claim 36, further comprising a wheel alignment system including a tether attached to a flange to which the proximal end of each rear leg is connected, the tether terminating at each rear wheel, the tether becoming taut when the rear wheels are deployed to align the rear wheels in a position parallel to the side of the bag, and the tether becoming slack when the rear wheels are retracted, to allow each rear wheel to pivot inward to access a stowage compartment beneath the base of the bag.

46. The sports equipment bag assembly of claim 36, further comprising a locking mechanism to secure the integral transportation system in a fully deployed position and a fully retracted position.

47. The sports equipment bag assembly of claim 36, further comprising a frictional device adjacent to each wheel stowage compartment, the frictional device contacting the wheel to remove debris from the wheel through physical agitation.

\* \* \* \* \*